US012250085B2

United States Patent
Kang et al.

(10) Patent No.: US 12,250,085 B2
(45) Date of Patent: Mar. 11, 2025

(54) METHOD AND APPARATUS FOR SUPPORTING HARQ FEEDBACK TRANSMISSION IN DEVICE-TO-DEVICE COMMUNICATION SYSTEM

(71) Applicant: Samsung Electronics Co., Ltd., Suwon-si (KR)

(72) Inventors: Hyunjeong Kang, Suwon-si (KR); Sangkyu Baek, Suwon-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 413 days.

(21) Appl. No.: 17/441,196

(22) PCT Filed: Mar. 19, 2020

(86) PCT No.: PCT/KR2020/003761
§ 371 (c)(1),
(2) Date: Sep. 20, 2021

(87) PCT Pub. No.: WO2020/197167
PCT Pub. Date: Oct. 1, 2020

(65) Prior Publication Data
US 2022/0158776 A1    May 19, 2022

(30) Foreign Application Priority Data

Mar. 22, 2019  (KR) .................. 10-2019-0032806
Apr. 30, 2019  (KR) .................. 10-2019-0050283
Feb. 11, 2020  (KR) .................. 10-2020-0016669

(51) Int. Cl.
*H04L 1/1812*  (2023.01)
*H04L 1/1867*  (2023.01)
(Continued)

(52) U.S. Cl.
CPC .......... *H04L 1/1893* (2013.01); *H04L 1/1812* (2013.01); *H04W 76/27* (2018.02); *H04W 4/40* (2018.02); *H04W 28/0268* (2013.01)

(58) Field of Classification Search
USPC ....................................................... 370/329
See application file for complete search history.

(56) References Cited

U.S. PATENT DOCUMENTS 10,341,909 B2    7/2019  Jang et al.
2009/0103561 A1*  4/2009  Qi .......................... H04L 5/0007
                                                           370/468
(Continued)

FOREIGN PATENT DOCUMENTS

CN          105979601 A          9/2016

OTHER PUBLICATIONS

European Patent Office, "Supplementary European Search Report" issued Mar. 16, 2022, in connection with European Patent Application No. 20779226.8, 9 pages.
(Continued)

*Primary Examiner* — Gregory B Sefcheck
*Assistant Examiner* — Majid Esmaeilian

(57) ABSTRACT

The present disclosure relates to a 5th generation (5G) or pre-5G communication system for supporting a higher data transmission rate than a 4th generation (4G) communication system such as Long-Term Evolution (LTE). The present disclosure may be applied to intelligent services, such as smart homes, smart buildings, smart cities, smart cars or connected cars, health care, digital education, retail businesses, security and safety related services, and the like, on the basis of 5G communication technologies and IoT-related technologies. In addition, an operation method of a terminal in a wireless communication system may comprise the steps of: determining service information required by a V2X
(Continued)

application and determining a V2X transmission mode; determining QoS information of a service required by the V2X application; obtaining sidelink radio bearer configuration information corresponding to the QoS information; and, using the obtained sidelink radio bearer configuration information, transmitting and receiving V2X packets by means of a device-to-device communication method.

14 Claims, 27 Drawing Sheets

(51) Int. Cl.
    *H04W 4/40*       (2018.01)
    *H04W 28/02*      (2009.01)
    *H04W 76/27*      (2018.01)

(56) References Cited

U.S. PATENT DOCUMENTS

| | | | |
|---|---|---|---|
| 2016/0044708 A1* | 2/2016 | Lin | H04W 72/23 |
| | | | 370/280 |
| 2016/0338095 A1 | 11/2016 | Faurie et al. | |
| 2017/0215183 A1 | 7/2017 | Gulati et al. | |
| 2017/0331670 A1* | 11/2017 | Parkvall | H04L 41/0816 |
| 2018/0063816 A1 | 3/2018 | Gulati et al. | |
| 2018/0242228 A1* | 8/2018 | Jung | H04W 76/14 |
| 2019/0037459 A1 | 1/2019 | Pelletier et al. | |
| 2019/0058986 A1* | 2/2019 | Loehr | H04L 1/1825 |
| 2019/0245657 A1* | 8/2019 | Lee | H04W 80/02 |
| 2020/0146040 A1* | 5/2020 | Lee | H04W 72/56 |
| 2020/0146082 A1* | 5/2020 | Chen | H04W 72/21 |
| 2020/0195386 A1* | 6/2020 | Marinier | H04L 1/0088 |
| 2022/0060286 A1* | 2/2022 | Yoshioka | H04L 1/1854 |

OTHER PUBLICATIONS

Spreadtrum Communications: "Resource Allocation Consideration", 3GPP Draft; R2-1900934, Athens, Greece, Feb. 25-Mar. 1, 2019, 2 pages.
Sharp: "Discussion on HARQ-ACK and CSI procedure in NR V2X", 3GPP Draft; R1-1900831, Taipei, Taiwan, Jan. 21-25, 2019, 3 pages.
Sony: "Discussion on HARQ feedback for NR V2X communication", 3GPP Draft; R1-1900368, Taipei, Taiwan, Jan. 21-25, 2019, 5 pages.
Interdigital Inc: "On Physical Layer Procedures", 3GPP Draft; R1-1813227, Spokane, USA, Nov. 12-16, 2018, 5 pages.
Intel Corporation, "Sidelink physical layer procedures for NR V2X communication", 3GPP TSG RAN WG1 Ad-Hoc Meeting 1901, Jan. 21-25, 2019, R1-1900481, 17 pages.
Ericsson (Rapporteur), "Introduction of SA", Change Request, 3GPP TSG-WG2 Meeting #103, Aug. 20-24, 2018, R2-1813492, 32 pages.
Nec, "Physical layer procedures for NR V2X", 3GPP TSG RAN WG1 Ad-Hoc Meeting 1901, Jan. 21-25, 2019, R1-1900669, 6 pages.
Oppo, "Physical layer procedure for NR-V2X", 3GPP TSG RAN WG1 Ad-Hoc Meeting 1901, R1-1900301, 10 pages.
International Search Report dated Jul. 2, 2020 in connection with International Patent Application No. PCT/KR2020/003761, 2 pages.
Written Opinion of the International Searching Authority dated Jul. 2, 2020 in connection with International Patent Application No. PCT/KR2020/003761, 4 pages.
First Office Action dated Dec. 12, 2023, in connection with Chinese Application No. 202080022595.4, 15 pages.
Communication pursuant to Article 94(3) EPC dated Mar. 22, 2024, in connection with European Patent Application No. 20779226.8, 6 pages.
The Third Office Action dated Jan. 6, 2025, in connection with Chinese Application No. 202080022595.4, 16 pages.

* cited by examiner

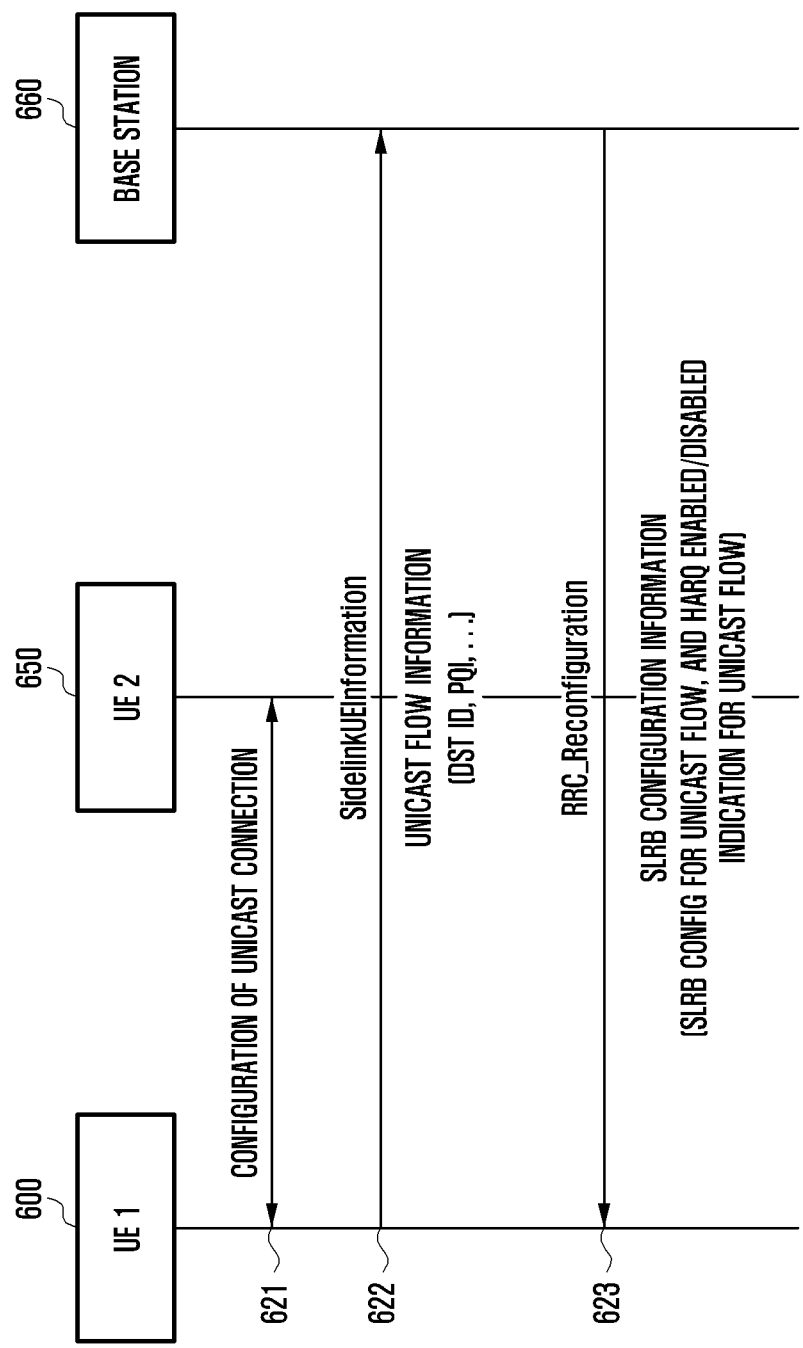

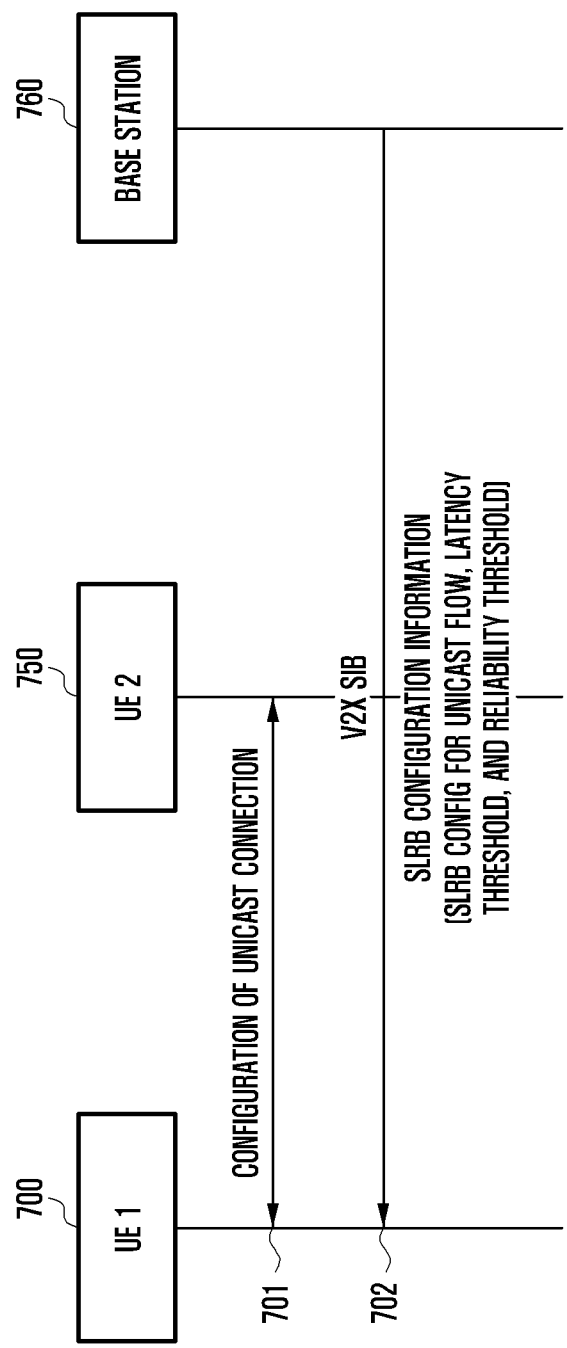

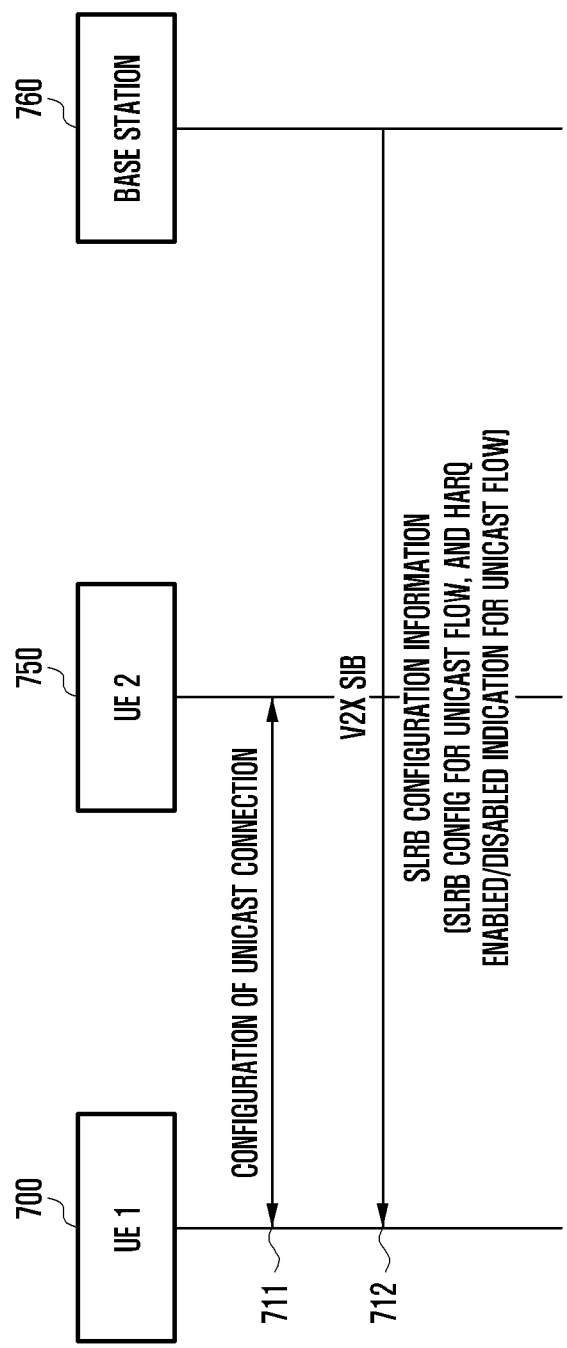

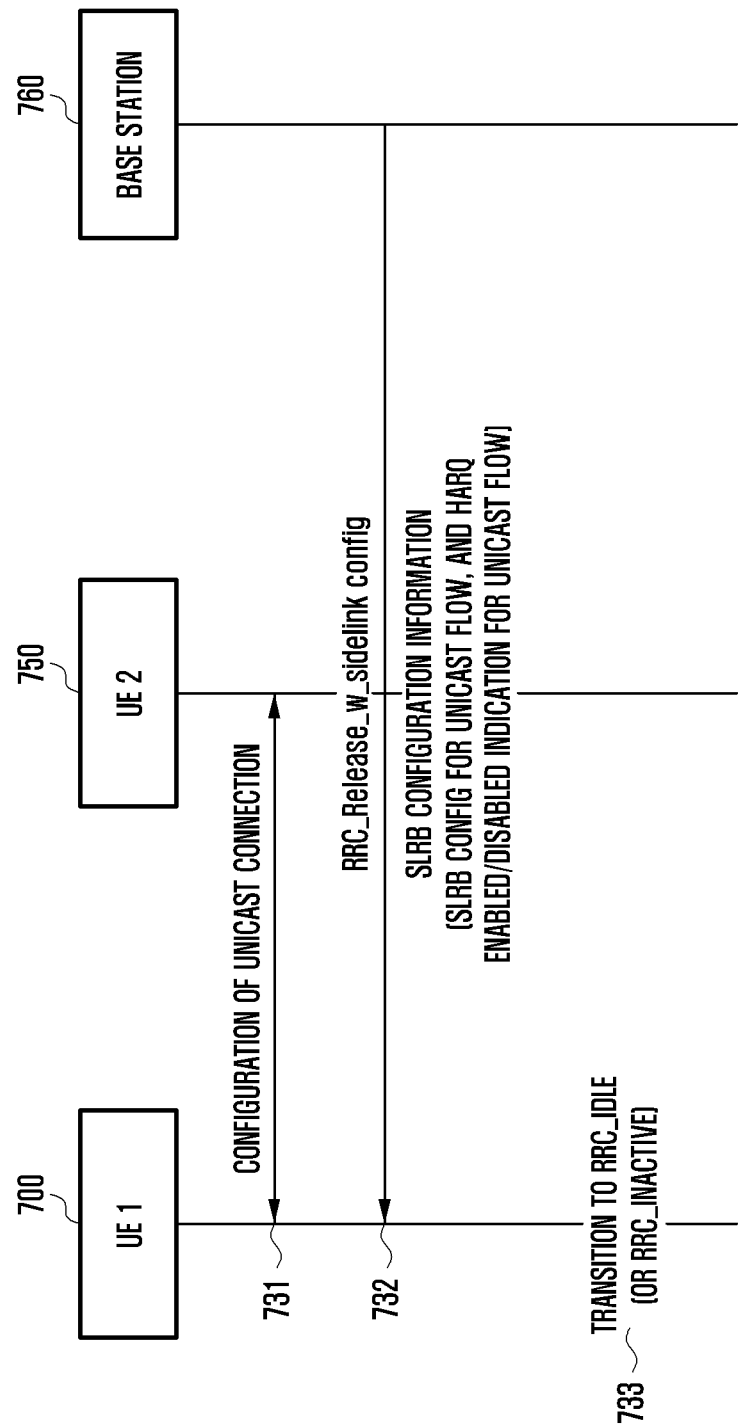

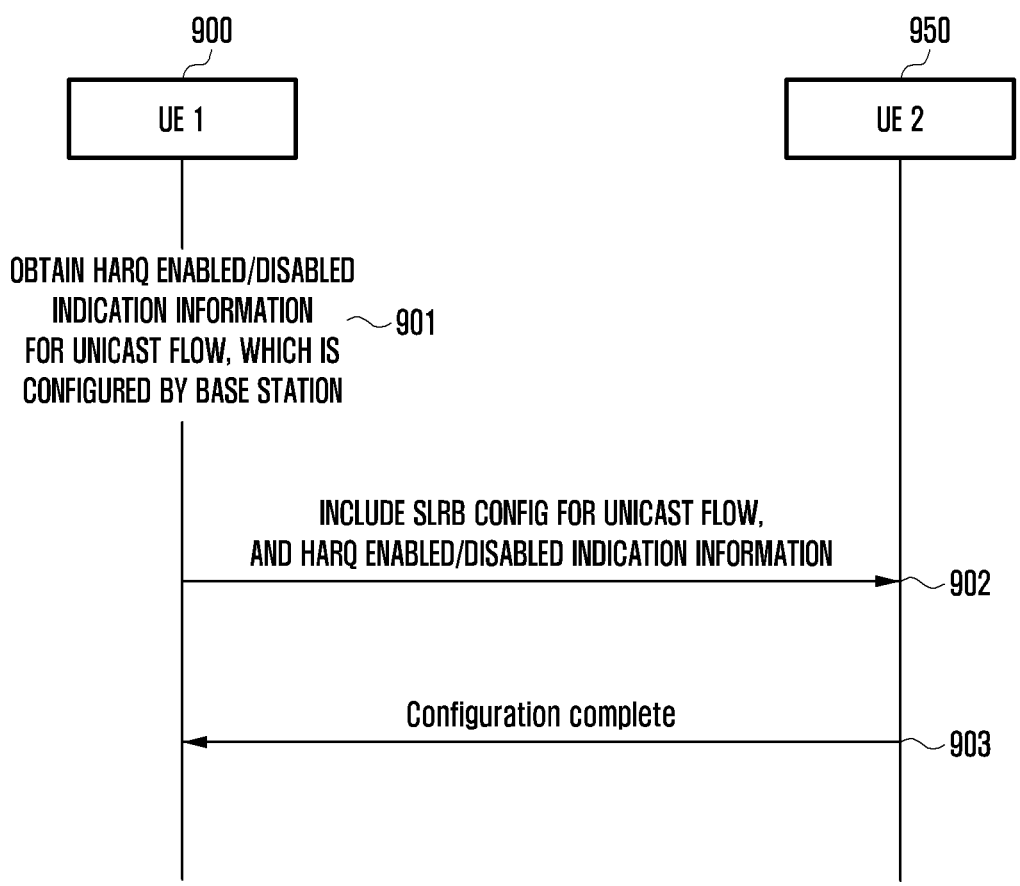

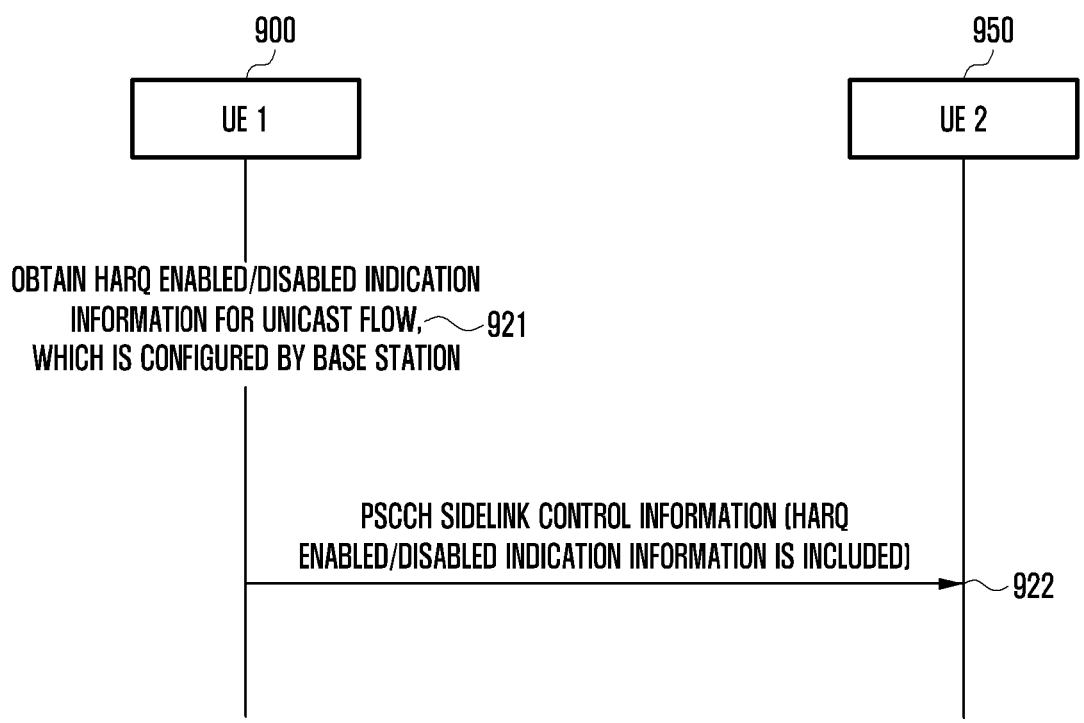

METHOD AND APPARATUS FOR SUPPORTING HARQ FEEDBACK TRANSMISSION IN DEVICE-TO-DEVICE COMMUNICATION SYSTEM

CROSS-REFERENCE TO RELATED APPLICATIONS

This application is a 371 of International Application No. PCT/KR2020/003761 filed on Mar. 19, 2020, which claims priority to Korean Patent Application No. 10-2019-0032806 filed on Mar. 22, 2019, Korean Patent Application No. 10-2019-0050283 filed on Apr. 30, 2019, and Korean Patent Application No. 10-2020-0016669 filed on Feb. 11, 2020, the disclosures of which are herein incorporated by reference in their entirety.

BACKGROUND

1. Field

The disclosure relates generally to a wireless communication system and, more specifically, to an apparatus and a method for supporting feedback signaling for data transmission of a direct communication bearer in a wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

For a 5G system, wireless interface schemes for providing a service having various quality of service (QoS) requirements are being discussed. For example, a direct communication method for a vehicle-to-everything (V2X) terminal has been proposed. Furthermore, various discussions are under way to shorten a communication time, increase reliability, and efficiently support device-to-device communication.

In accordance with the above discussion, the disclosure provides an apparatus and a method for supporting data transmission and a vehicle communication service achieving high reliability and low latency requirements by providing a method for performing a device-to-device communication scheme in a vehicle communication system.

SUMMARY

In order to solve the problem described above, a method of a first terminal in a wireless communication system according to an embodiment of the disclosure may include: transmitting data to a second terminal through a sidelink; identifying whether a hybrid automatic repeat request (HARQ) feedback for the sidelink is enabled; and if it is identified that an HARQ feedback for the sidelink is enabled, monitoring HARQ feedback information on the data.

In addition, a first terminal in a wireless communication system according to an embodiment of the disclosure may include: a transceiver; and a controller configured to: control the transceiver to transmit data to a second terminal through a sidelink; identify whether a hybrid automatic repeat request (HARQ) feedback for the sidelink is enabled; and if it is identified that an HARQ feedback for the sidelink is enabled, control the transceiver to monitor HARQ feedback information on the data. According to various embodiments of the disclosure, an operation method of a terminal in a wireless communication system includes: determining, by the terminal, a V2X service requiring a sidelink direct communication; determining quality of service (QoS) information required in the service; and acquiring reliability requirement or latency requirement information required in the service. The method includes controlling a sidelink vehicle to everything communication (V2X) wireless parameter configuration to transmit feedback signaling for a transmission packet so as to satisfy a reliability QoS requirement of a V2X service by using a sidelink direct communication. The method includes controlling a sidelink vehicle to everything communication (V2X) wireless parameter configuration not to transmit feedback signaling for a transmission packet so as to satisfy a latency QoS requirement of a V2X service by using a sidelink direct communication. Acquiring wireless parameter configuration information for determining whether to transmit feedback signaling, by a terminal which transmits or receives a direct communication-based V2X service, includes: transferring QoS information of the service to a base station, and acquiring parameter configuration information for determining whether to transmit feedback signaling for a radio bearer of the service; providing, by the base station and as a system parameter, parameter configuration information for determining whether to transmit feedback signaling for a radio bearer corresponding to QoS information, and acquiring the parameter configuration information by the terminal; and acquiring, by the terminal, parameter configuration information for determining whether to transmit feedback signaling for a radio bearer corresponding to QoS information pre-configured for the terminal.

According to various embodiments of the disclosure, a terminal device in a wireless communication system according to various embodiments includes: a transceiver; and at least one processor functionally combined with the transceiver. The at least one processor controls, if it is determined that the terminal is within a coverage of a base station, the terminal to: determine QoS information required in a V2X service; request, from the base station, parameter configuration information for determining whether to transmit feedback signaling for a radio bearer corresponding to the QoS information; and be allocated the parameter configuration information. The at least one processor controls, if it is determined that the terminal is not within a coverage of a base station, the terminal to: determine QoS information required in a V2X service; and acquire parameter configuration information for determining whether to transmit feedback signaling for a radio bearer corresponding to pre-configured QoS information.

According to various embodiments of the disclosure, an operation method of a terminal in a wireless communication system may include: determining service information required by a V2X application and determining QoS information of a service required by the V2X application; acquiring parameter configuration information for determining whether to transmit feedback signaling for a sidelink radio bearer corresponding to the QoS information; and transmitting or receiving a V2X packet in a direct communication scheme by using the acquired parameter configuration information of the sidelink radio bearer.

According to various embodiments of the disclosure, a terminal in a wireless communication system may include: a transceiver configured to transmit or receive data; and at least one processor functionally combined with the transceiver, wherein at least one processor determines service information required by a V2X application; determines QoS information of a service required by the V2X application; acquires parameter configuration information for determining whether to transmit feedback signaling for a sidelink radio bearer corresponding to the QoS information; and transmits or receives a V2X packet in a direct communication scheme by using the acquired parameter configuration information of the sidelink radio bearer.

Various embodiments of the disclosure provide a device and a method capable of supporting a vehicle communication service requiring various quality of service (QoS) by using a device-to-device communication in a vehicle communication system, so that reliability and latency requirement values of a vehicle communication can be achieved.

Effects which can be acquired by the disclosure are not limited to the effects described above, and other effects that have not been mentioned may be clearly understood by those skilled in the art from the following description.

BRIEF DESCRIPTION OF THE DRAWINGS

FIG. 6B illustrates a signaling procedure for configuring, for a terminal in an RRC-CONNECTED state, a parameter for determining whether to transmit feedback signaling in a device-to-device communication according to various embodiments of the disclosure;

FIG. 7A illustrates a signaling procedure for configuring, for a terminal in an RRC-IDLE state or a terminal in an RRC-INACTIVE state, a parameter for determining whether to transmit feedback signaling in a device-to-device communication according to various embodiments of the disclosure;

FIG. 7B illustrates a signaling procedure for configuring, for a terminal in an RRC-IDLE state or a terminal in an RRC-INACTIVE state, a parameter for determining whether to transmit feedback signaling in a device-to-device communication according to various embodiments of the disclosure;

FIG. 7D illustrates a signaling procedure for configuring, for a terminal in an RRC-IDLE state or a terminal in an RRC-INACTIVE state, a parameter for determining whether to transmit feedback signaling in a device-to-device communication according to various embodiments of the disclosure;

FIG. 9A illustrates a signaling procedure for configuring a parameter for determining whether to transmit feedback signaling between terminals which transmit and receive a V2X packet, based on direct communication according to various embodiments of the disclosure;

FIG. 9C illustrates a signaling procedure for configuring a parameter for determining whether to transmit feedback signaling between terminals which transmit and receive a V2X packet, based on direct communication according to various embodiments of the disclosure;

DETAILED DESCRIPTION

The terms used in the disclosure are only used to describe specific embodiments, and may not be intended to limit the disclosure. A singular expression may include a plural expression unless they are definitely different in a context.

Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

Hereinafter, the disclosure relates to an apparatus and a method for acquiring a configuration parameter for determination on transmission of feedback signaling for a sidelink radio bearer corresponding to a quality of service (QoS) requirement of a vehicle-to-everything (V2X) communication service in a wireless communication system. Feedback signaling may include, for example, an HARQ feedback. Specifically, the disclosure provides a technology for satisfying a QoS level required for various V2X services, based on a method for acquiring a configuration parameter for determination on transmission of feedback signaling for a sidelink radio bearer for a sidelink direct communication between vehicle-to-everything (V2X) terminals in a wireless communication system.

In the following description, a term indicating a signal, a term indicating a channel, a term indicating control information, terms indicating network entities, terms indicating elements of a device, and the like are exemplified for convenience of explanation. Accordingly, the disclosure is not limited to the following terms and other terms having the same technical meaning may be used.

In addition, the disclosure includes terms used in some communication protocols (e.g., 3rd generation partnership project (3GPP)) to explain various embodiments, but the terms merely correspond to examples. Various embodiments may also be easily modified and then applied to other communication systems.

Figure 1:
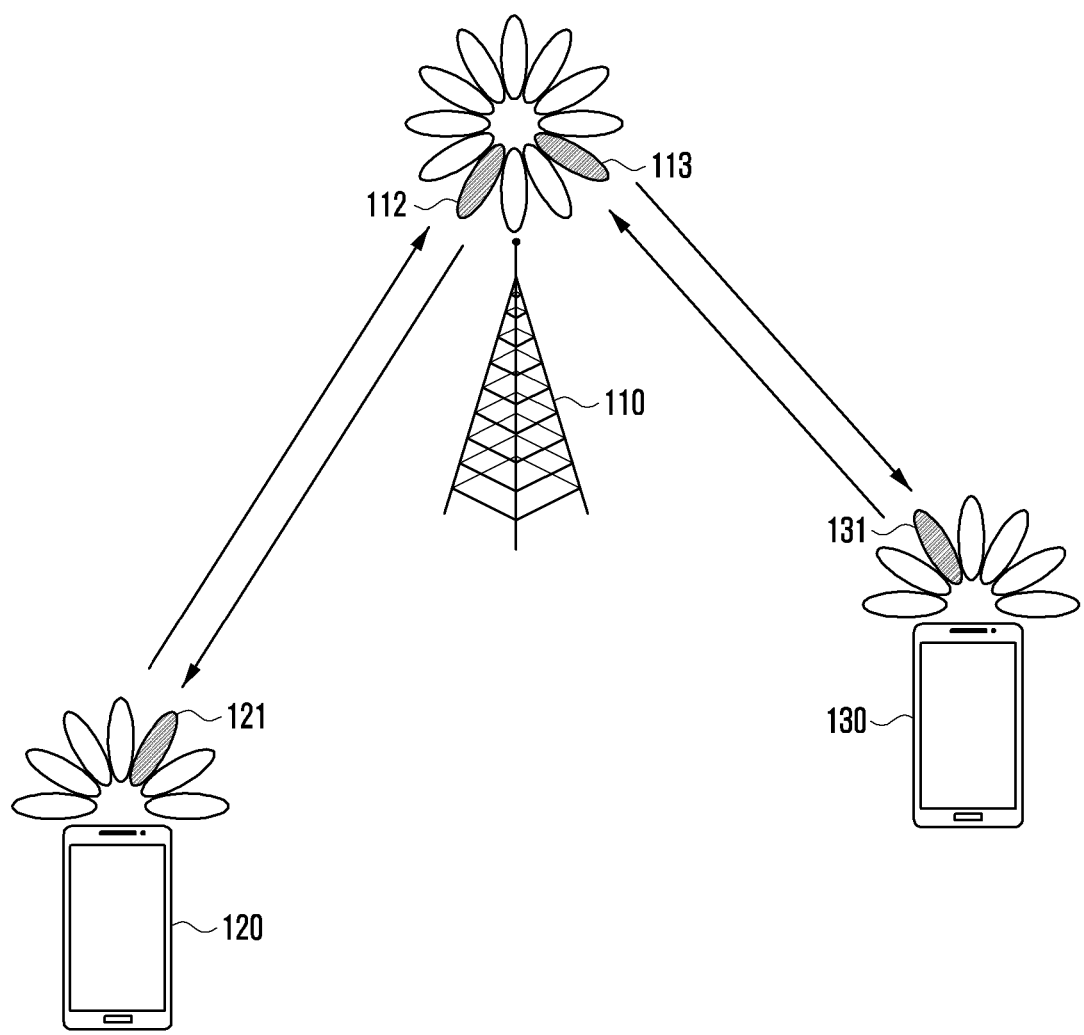
FIG. 1 illustrates a wireless communication system according to various embodiments of the disclosure.

FIG. 1 illustrates a wireless communication system according to various embodiments of the disclosure. FIG. 1 illustrates a base station 110, a terminal 120, and a terminal 130 as a part of nodes using wireless channels in a wireless communication system. Although FIG. 1 illustrates only one base station, another base station identical to or similar to the base station 110 may be further included. Although FIG. 1 illustrates only two terminals, another terminal identical to or similar to the terminal 120 and the terminal 130 may be further included.

The base station 110 is a network infrastructure that provides wireless access to the terminals 120 and 130. The base station 110 has a coverage defined as a particular geographic area, based on a distance by which the base station is able to transmit a signal. The base station 110 may be also called "an access point (AP)", "an eNodeB (eNB)", "a 5th generation (5G) node", "an 5G nodeB (gNodeB, or gNB)", "a wireless point", "a transmission/reception point (TRP)" or other terms having a technical meaning equivalent thereto.

Each of the terminals 120 and 130 is a device used by a user and communicates with the base station 110 through a wireless channel. In some cases, at least one of the terminals 120 and 130 may be operated without involvement of a user. That is, at least one of the terminals 120 and 130 is a device configured to perform a machine-type communication (MTC) and may not be carried by a user. Each of the terminals 120 and 130 may be called "a user equipment (UE)", "a mobile station", "a subscriber station", "a remote terminal", "a wireless terminal", "a user device", or another term having a technical meaning equivalent thereto.

The base station 110 and the terminals 120 and 130 may transmit and receive a wireless signal in a sub 6 GHz band and a millimeter wave (mmWave) band (e.g., 28 GHz, 30 GHz, 38 GHz, or 60 GHz). To improve a channel gain, the base station 110 and the terminals 120 and 130 may perform beamforming. Beamforming may include transmission beamforming and reception beamforming. That is, the base station 110 and the terminals 120 and 130 may give directivity to a transmission signal or a reception signal. To this end, the base station 110 and the terminals 120 and 130 may select serving beams 112, 113, 121, and 131 through a beam search procedure or a beam management procedure. Communication after the serving beams 112, 113, 121, and 131 are selected may be performed on resources having a quasi-co-located (QCL) relationship with resources used for transmission of the serving beams 112, 113, 121, and 131.

If large-scale characteristics of a channel having transferred a symbol on a first antenna port can be inferred from a channel having transferred a symbol on a second antenna port, the first antenna port and the second antenna port may be considered to have a QCL relationship therebetween. For example, the large-scale characteristics may include at least one of delay spread, Doppler spread, Doppler shift, average gain, average delay, and spatial receiver parameter.

Figure 2:
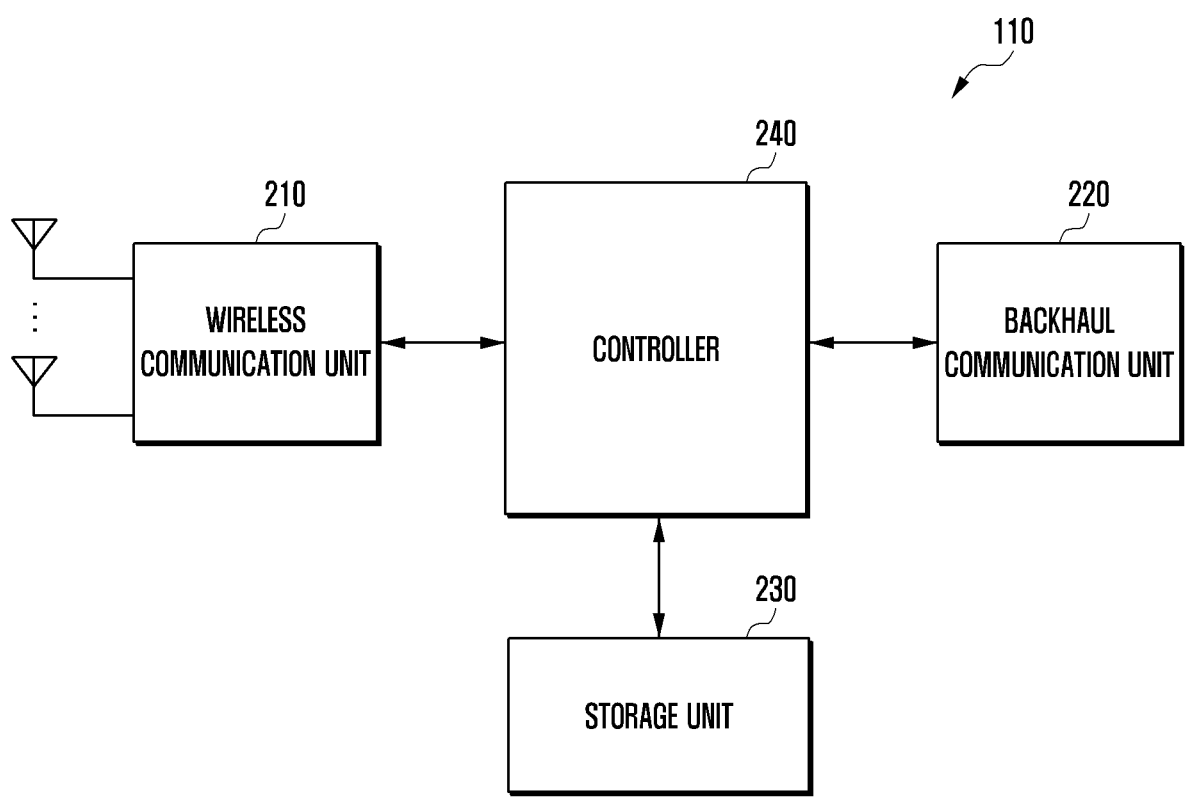
FIG. 2 illustrates a configuration of a base station in a wireless communication system according to various embodiments of the disclosure.

FIG. 2 illustrates a configuration of a base station in a wireless communication system according to various embodiments of the disclosure. The configuration illustrated in FIG. 2 may be understood as a configuration of the base station 110. The term " . . . unit" or the ending of a word, such as " . . . or", " . . . er", or the like used hereinafter may indicate a unit of processing at least one function or operation, and this may be embodied by hardware, software, or a combination of hardware and software.

Referring to FIG. 2, a base station includes a wireless communication unit 210, a backhaul communication unit 220, a storage unit 230, and a controller 240.

The wireless communication unit 210 performs functions for transmitting or receiving a signal through a wireless channel. For example, the wireless communication unit 210 performs a function of conversion between a baseband signal and a bit stream according to a physical layer protocol of a system. For example, when data is transmitted, the wireless communication unit 210 generates complex symbols by encoding and modulating a transmission bit stream. Furthermore, when data is received, the wireless communication unit 210 reconstructs a reception bit stream by demodulating and decoding a baseband signal.

In addition, the wireless communication unit 210 up-converts a baseband signal into a radio-frequency (RF) band signal and then transmits the converted RF band signal through an antenna, and down-converts an RF band signal received through an antenna into a baseband signal. To this end, the wireless communication unit 210 may include a transmission filter, a reception filter, an amplifier, a mixer, an oscillator, a digital-to-analog converter (DAC), an analog-to-digital converter (ADC), and the like. In addition, the wireless communication unit 210 may include a plurality of transmission/reception paths. Furthermore, the wireless communication unit 210 may include at least one antenna array configured by multiple antenna elements.

In view of hardware, the wireless communication unit 210 may be configured by a digital unit and an analog unit, and the analog unit may include a plurality of sub-units according to operating power, operating frequency, etc. The digital unit may be implemented as at least one processor (e.g., a digital signal processor (DSP)).

The wireless communication unit 210 may transmit and receive a signal as described above. Accordingly, the entirety or a part of the wireless communication unit 210 may be called "a transmitter", "a receiver", or "a transceiver". Furthermore, in the following description, transmission and reception through a wireless channel may be understood to include the above processing performed by the wireless communication unit 210.

The backhaul communication unit 220 provides an interface for performing communication with other nodes within a network. That is, the backhaul communication unit 220 converts, into a physical signal, a bit stream transmitted from the base station to another node, for example, another access node, another base station, a higher node, a core network, etc., and converts a physical signal received from another node into a bit stream.

The storage unit 230 stores data such as a basic program, an application program, and configuration information for operation of the base station. The storage unit 230 may be configured as a volatile memory, a nonvolatile memory, or a combination of a volatile memory and a nonvolatile memory. The storage unit 230 provides stored data according to a request of the controller 240.

The controller 240 controls overall operations of the base station. For example, the controller 240 transmits and receives a signal through the wireless communication unit 210 or the backhaul communication unit 220. Furthermore, the controller 240 records and reads data in and from the storage unit 230. In addition, the controller 240 may perform functions of a protocol stack required in a communication protocol. According to another embodiment, the protocol stack may be included in the wireless communication unit 210. To this end, the controller 240 may include at least one processor.

According to various embodiments, the controller 240 may transmit radio resource control (RRC) configuration information to the terminal 110. The controller 240 may transmit sidelink configuration information to the terminal 110. For example, the controller 240 may control the base station to perform operations according to various embodiments described later.

Figure 3:
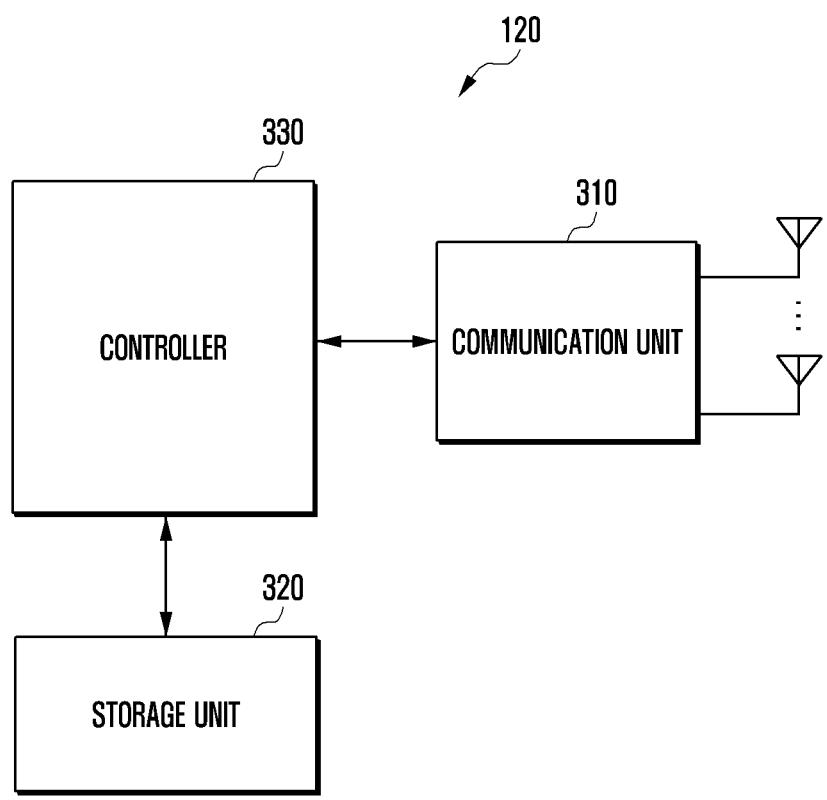
FIG. 3 illustrates a configuration of a terminal in a wireless communication system according to various embodiments of the disclosure.

FIG. 3 illustrates a configuration of a terminal in a wireless communication system according to various embodiments of the disclosure. The configuration illustrated in FIG. 3 may be understood as a configuration of the terminal 120 or the terminal 130. The term " . . . unit" or the ending of a word, such as " . . . or", " . . . er", or the like used hereinafter may indicate a unit of processing at least one function or operation, and this may be embodied by hardware, software, or a combination of hardware and software.

Referring to FIG. 3, a terminal includes a communication unit 310, a storage unit 320, and a controller 330.

The communication unit 310 performs functions for transmitting or receiving a signal through a wireless channel. For example, the communication unit 310 performs a function of conversion between a baseband signal and a bit stream according to a physical layer protocol of a system. For example, when data is transmitted, the communication unit 310 generates complex symbols by encoding and modulating a transmission bit stream. In addition, when data is received, the communication unit 310 reconstructs a reception bit stream by demodulating and decoding a baseband signal. Furthermore, the communication unit 310 up-converts a baseband signal into an RF band signal and then transmits the converted RF band signal through an antenna, and down-converts an RF band signal received through an antenna into a baseband signal. For example, the communication unit 310 may include a transmission filter, a reception filter, an amplifier, a mixer, an oscillator, a DAC, an ADC, and the like.

In addition, the communication unit 310 may include a plurality of transmission/reception paths. Furthermore, the communication unit 310 may include at least one antenna array including a plurality of antenna elements. In view of hardware, the communication unit 310 may be configured as a digital circuit and an analog circuit (e.g., radio-frequency integrated circuit (RFIC)). The digital circuit and the analog circuit may be implemented as a single package. Furthermore, the communication unit 310 may include a plurality of RF chains. Moreover, the communication unit 310 may perform beamforming.

In addition, the communication unit 310 may include different communication modules to process signals in different frequency bands. Furthermore, the communication unit 310 may include a plurality of communication modules for supporting a plurality of different wireless access technologies. For example, the different wireless access technologies may include Bluetooth low energy (BLE), wireless fidelity (Wi-Fi), Wi-Fi gigabyte (WiGig), a cellular network (e.g., long term evolution (LTE)) and the like. In addition, the different frequency bands may include a super high frequency (SHF) (e.g., 2.5 GHz, 3.5 GHz, or 5 GHz) band, and a millimeter (mm) wave (e.g., 60 GHz) band.

The communication unit 310 transmits and receives a signal as described above. Accordingly, the entirety or a part of the communication unit 310 may be called "a transmitter", "a receiver", or "a transceiver". In addition, in the following description, transmission and reception through a wireless channel may be understood to include the above processing performed by the communication unit 310.

The storage unit 320 stores data such as a basic program, an application program, and configuration information for operation of the terminal. The storage unit 320 may be configured as a volatile memory, a nonvolatile memory, or a combination of a volatile memory and a nonvolatile memory. The storage unit 320 provides stored data according to a request of the controller 330.

The controller 330 controls overall operations of the terminal. For example, the controller 330 transmits and receives a signal through the communication unit 310. In addition, the controller 330 records and reads data in and from the storage unit 320. In addition, the controller 330 may perform functions of a protocol stack required in a communication protocol. To this end, the controller 330 may include at least one processor or microprocessor, or may be a part of a processor. Furthermore, the controller 330 and a part of the communication unit 310 may be called a communication processor (CP).

According to various embodiments, when the terminal 120 performs a sidelink direct communication with another terminal, the controller 330 may cause the terminal 120 to: determine service information required by a V2X application, and determine QoS information of a V2X service; acquire a configuration parameter required for determining whether to transmit feedback signaling for a sidelink radio bearer corresponding to the QoS information; and transmit or receive a V2X packet in a direct communication scheme by using acquired configuration information required for determining whether to transmit feedback signaling for the sidelink radio bearer. For example, the controller 330 may control the terminal to perform operations according to various embodiments described later.

Figure 4A:
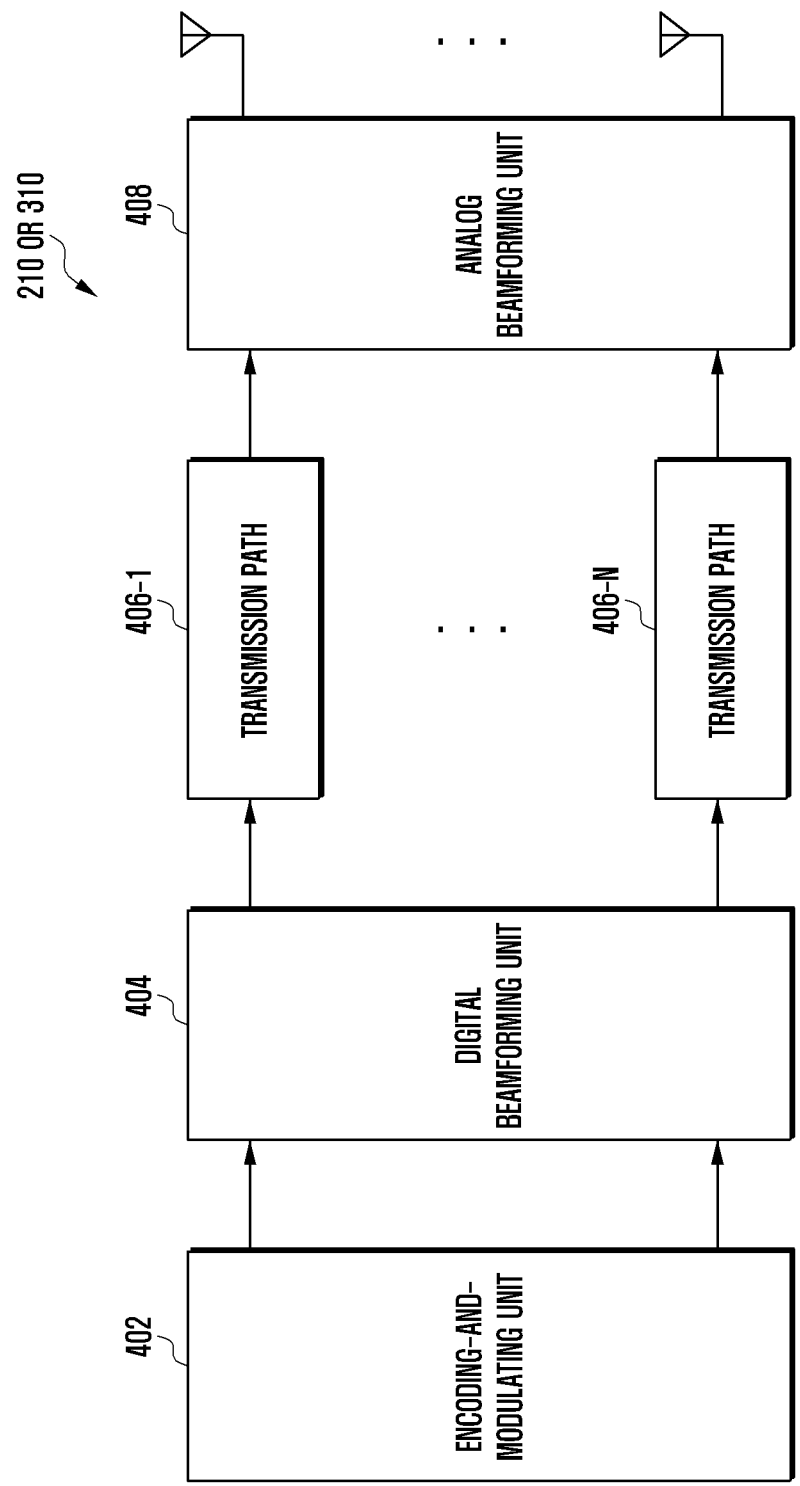
FIG. 4A illustrates a configuration of a communication unit in a wireless communication system according to various embodiments of the disclosure.
Figure 4B:
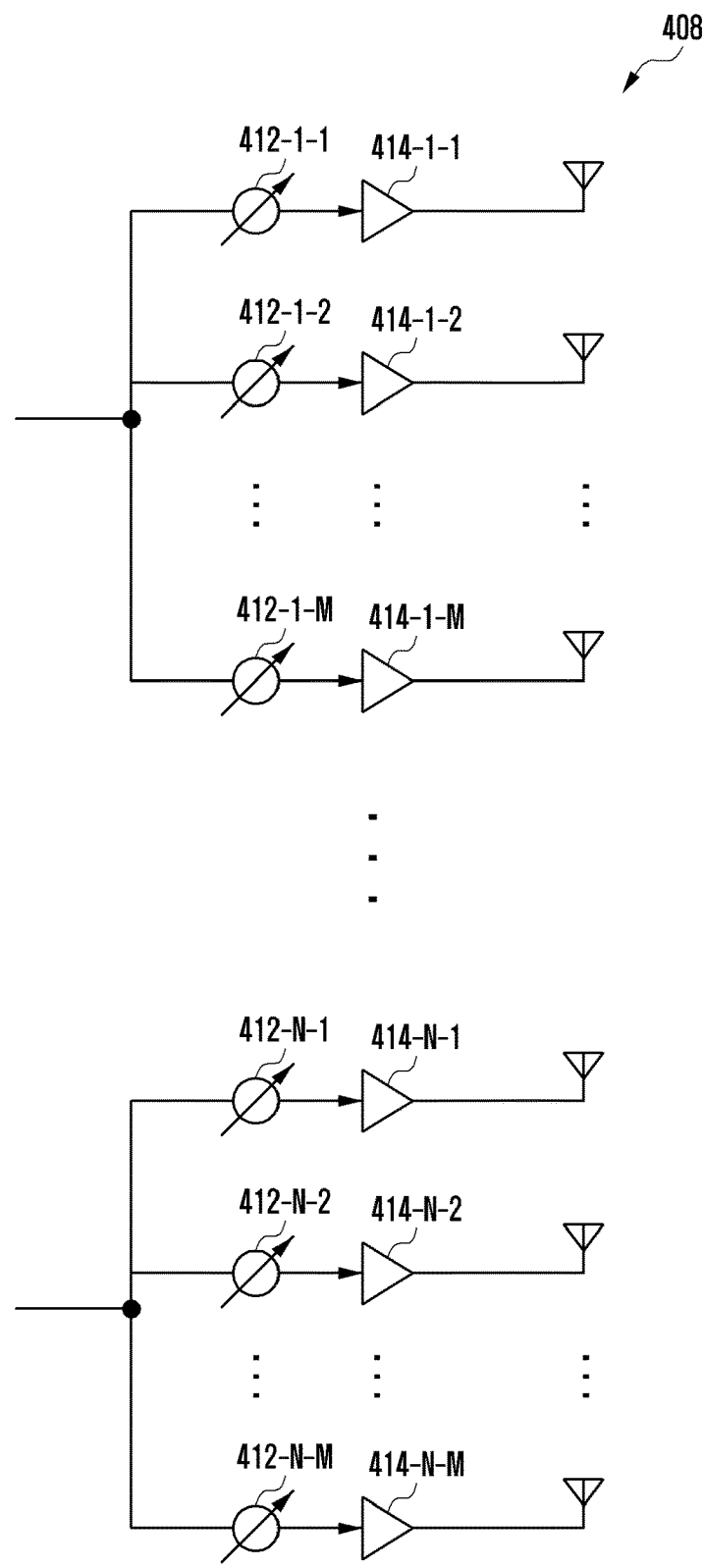
FIG. 4B illustrates an example in which an independent antenna array is independently used for each transmission path in an analog beamforming unit of a communication unit in a wireless communication system according to various embodiments of the disclosure.
Figure 4C:
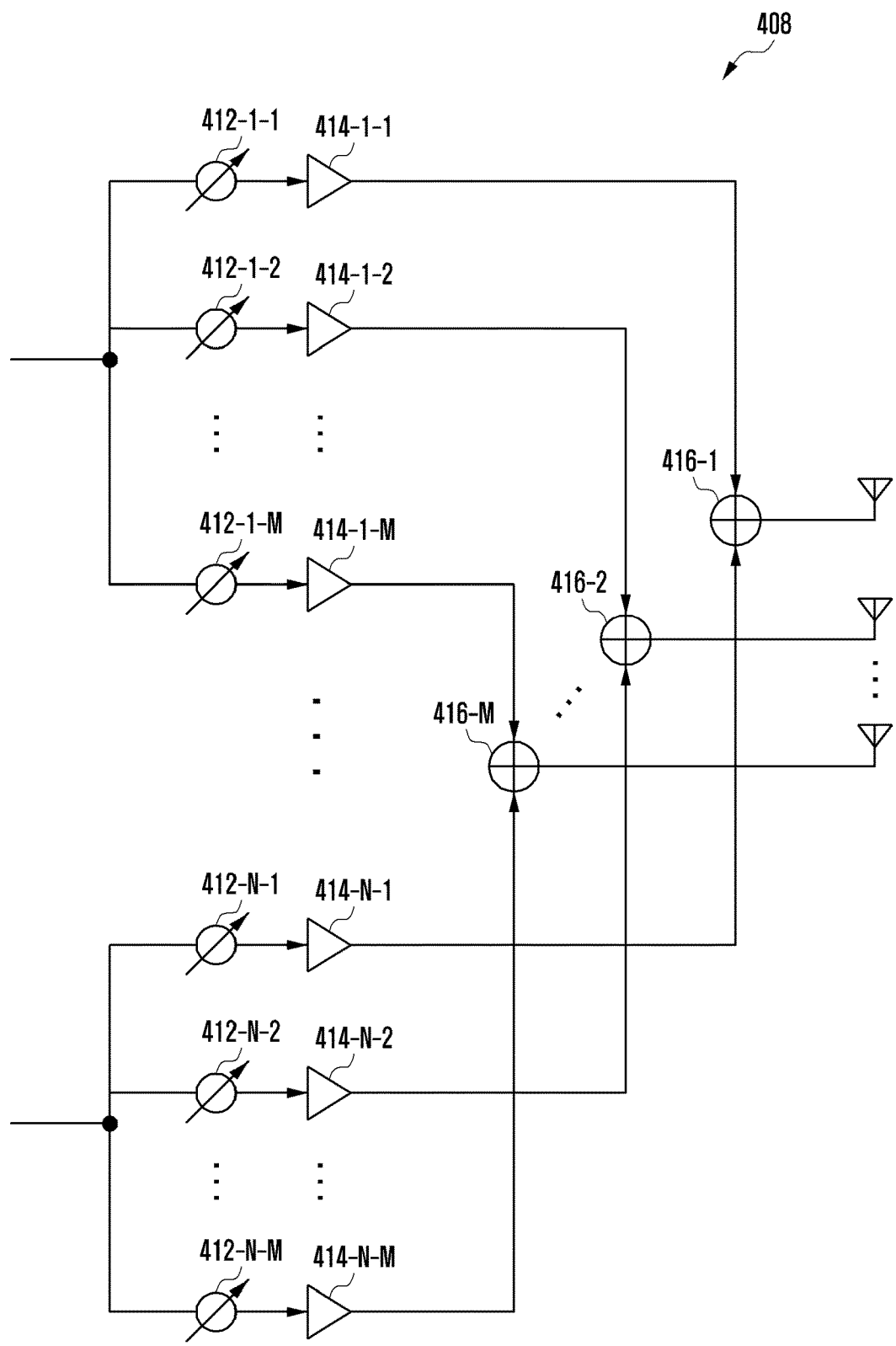
FIG. 4C illustrates an example in which one antenna array is shared by transmission paths in an analog beamforming unit of a communication unit in a wireless communication system according to various embodiments of the disclosure.

FIG. 4A to FIG. 4C illustrate a configuration of a communication unit in a wireless communication system according to various embodiments of the disclosure. FIG. 4A to FIG. 4C illustrate an example of a specific configuration of the wireless communication unit 210 illustrated in FIG. 2 or the communication unit 310 illustrated in FIG. 3. Specifically, FIG. 4A to FIG. 4C illustrate elements configured to perform beamforming, which are a part of the wireless communication unit 210 in FIG. 2 or the communication unit 310 in FIG. 3.

Referring to FIG. 4A, the wireless communication unit 210 or the communication unit 310 includes an encoding-and-modulating unit 402, a digital beamforming unit 404, a plurality of transmission paths 406-1 to 406-N, and an analog beamforming unit 408.

The encoding-and-modulating unit 402 performs channel encoding. For channel encoding, at least one of a low density parity check (LDPC) code, a convolution code, and a polar code may be used. The encoding-and-modulating unit 402 generates modulation symbols by performing constellation mapping.

The digital beamforming unit 404 performs beamforming on a digital signal (e.g., modulation symbols). To this end, the digital beamforming unit 404 multiplies beamforming weights to modulation symbols. The beamforming weights are used for changing the size and the phase of a signal, and may be called "a precoding matrix", "a precoder", etc. The digital beamforming unit 404 outputs, to the plurality of transmission paths 406-1 to 406-N, modulation symbols which have been digital-beamformed. According to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert, into analog signals, digital-beamformed digital signals. To this end, each of the plurality of transmission paths 406-1 to 406-N may include an inverse fast Fourier transform (IFFT) operator, a cyclic prefix (CP) inserter, a DAC, and an upconverter. The CP inserter is designed for an orthogonal frequency division multiplexing (OFDM) scheme, and may be excluded in a case where a different physical layer scheme (e.g., filter bank multi-carrier (FBMC)) is applied. That is, the plurality of transmission paths 406-1 to 406-N provide independent signal processing processes for multiple streams generated through digital beamforming, respectively. However, according to an implementation method, a part of the elements of each of the plurality of transmission paths 406-1 to 406-N may be shared.

The analog beamforming unit 408 performs beamforming on an analog signal. To this end, the digital beamforming unit 404 multiplies beamforming weights to analog signals. The beamforming weights are used for changing the size and the phase of a signal. Specifically, according to a connection structure between the plurality of transmission paths 406-1 to 406-N and antennas, the analog beamforming unit 408 may be configured as illustrated in FIG. 4B or FIG. 4C.

Referring to FIG. 4B, signals input to the analog beamforming unit 408 undergo phase/size conversion and amplification operations, and are then transmitted through antennas. The signals in the paths are transmitted through different antenna sets, that is, antenna arrays, respectively. In relation to processing of a signal input through a first path, the signal is converted into a signal stream including signals having an identical phase or size or different phases or sizes by phase/size converters 412-1-1 to 412-1-M, the converted signal stream is amplified by amplifiers 414-1-1 to 414-1-M, and then the amplified signal stream is transmitted through antennas, respectively.

Referring to FIG. 4C, signals input to the analog beamforming unit 408 undergo phase/size conversion and amplification operations, and are then transmitted through antennas. The signals in the paths are transmitted through an identical antenna set, that is, an antenna array. In relation to processing of a signal input through a first path, the signal is converted into a signal stream including signals having an identical phase or size or different phases or sizes by phase/size converters 412-1-1 to 412-1-M, and the converted signals are amplified by amplifiers 414-1-1 to 414-1-M. In order to be transmitted through a single antenna array, amplified signals are added together based on antenna elements by adders 416-1 to 416-M, and then the added signals are transmitted through the antennas, respectively.

FIG. 4B illustrates an example in which an independent antenna array is used for each transmission path, and FIG. 4C illustrates an example in which one antenna array is shared by transmission paths. However, according to another embodiment, some transmission paths may use independent antenna arrays, and the remaining transmission paths may share a single antenna array. Furthermore, according to yet other embodiment, a switchable structure between transmission paths and antenna arrays may be applied to allow use of a structure which is changeable adaptively according to a situation.

A V2X service may be divided into a basic safety service and an advanced service. The basic safety service may correspond to a detailed service, such as a left-turn notification service, a front-car collision warning service, an emergency car access notification service, a front obstacle warning service, and an intersection traffic light information service, in addition to a vehicle notification (CAM or BSM) service, and may transmit or receive V2X information by using a broadcast, unicast, or groupcast transmission scheme. The advanced service not only has enhanced QoS requirements compared to the basic safety service, but also requires a method capable of transmitting or receiving V2X information by using unicast and groupcast transmission schemes rather than a broadcast transmission scheme, so as to allow V2X information to be transmitted or received in a particular vehicle group or between two vehicles. A method capable of transmitting feedback signaling for a transmission packet is required for a service requiring a high level of reliability according to enhanced QoS requirements. The advanced service may correspond to a detailed service such as a platooning service, a self-driving service, a remote driving service, and an extended sensor-based V2X service.

For a V2X service, a UE may perform the V2X service through an ng-RAN (gNB) connected to a 5G core network, or an E-UTRAN (ng-eNB) connected to a 5G core network in the ng-RAN or the E-UTRAN. In another embodiment, in a case where a base station (ng-RAN or ng-eNB) is connected to an evolved packet core network (EPC), a V2X service may be performed through the base station. In another embodiment, in a case where a base station (eNB) is connected to an evolved packet core network (EPC), a V2X service may be performed through the base station. A V2X wireless interface communication scheme which is available for a device-to-device communication may correspond to at least one of unicast, groupcast, and broadcast, and when V2X transmission or reception is performed in each of the communication schemes, a method for managing and configuring a wireless communication parameter suitable for QoS requirements of a V2X service is required to be provided.

A system which performs a device-to-device communication, based on LTE wireless communication defines a transmission terminal to select and operate a parameter required for transmission by the terminal itself. When LTE wireless communication is used, a V2X service message for basic safety is transmitted in a device-to-device communication scheme. The QoS requirements of a basic safety V2X service are not strict, and even when there are various basic safety services, the QoS requirements thereof are not various, and the differences between the services are not large. Therefore, even a mode in which a base station schedules a wireless resource to be used in a device-to-device communication, based on LTE wireless communication, is operated such that the base station schedules a wireless resource without acquiring specific QoS requirement information of a V2X service, and a terminal randomly manages and configures a parameter.

The advanced V2X service has various QoS requirements, and has a large difference between QoS levels required for V2X services. In a case of a particular advanced V2X service, the service can be operated only when a wireless resource and a wireless parameter for direct communication are configured to satisfy strict QoS requirements of the service. Therefore, a method for guaranteeing service QoS is required to be provided for a device-to-device communication-based system for supporting an advanced V2X service, compared to a conventional system. For example, QoS levels for reliability and latency, which are required for services, are different. Therefore, in order to guarantee required QoS levels, a configuration parameter of a direct communication radio bearer is required to be operated.

In the disclosure, a method for determining QoS information corresponding to a sidelink radio access bearer for performing a direct vehicle-to-vehicle communication scheme required for a basic safety service or an advanced service, and acquiring a configuration parameter for determining feedback transmission corresponding to the QoS information according to various embodiments will be described.

FIGS. 5A to 5D illustrate situations in which a device-to-device communication is performed by using a sidelink RAT according to various embodiments of the disclosure.

Figure 5:
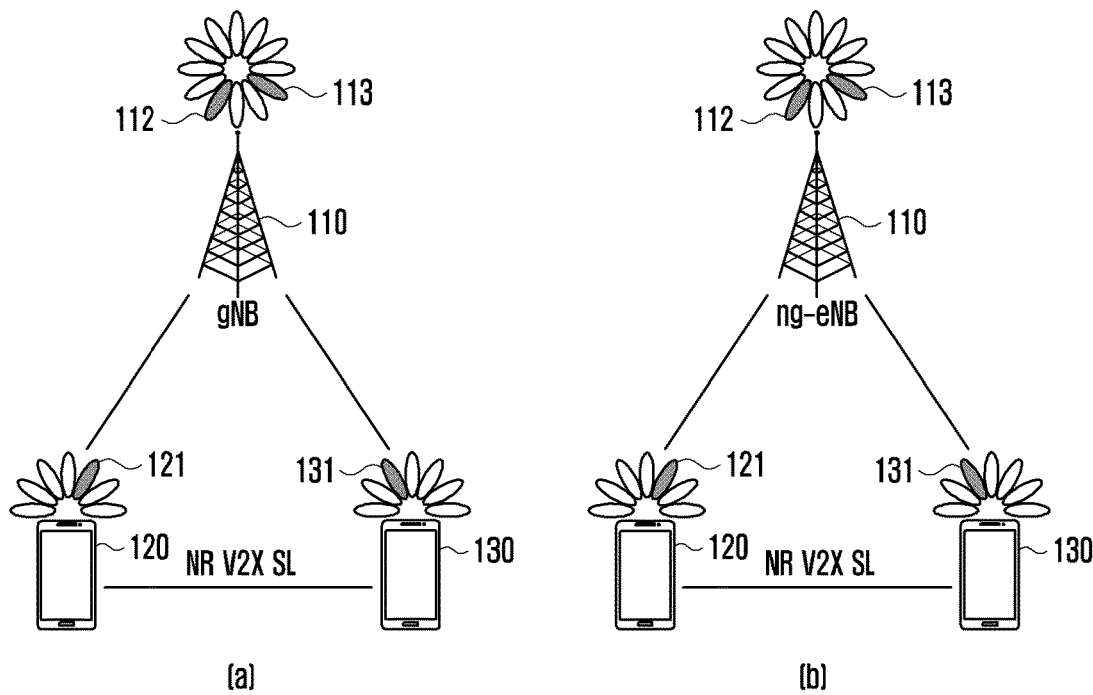
FIGS. 5A to 5D illustrate situations in which a device-to-device communication is performed by using a sidelink radio access technology (RAT) according to various embodiments of the disclosure.
Figure 5:
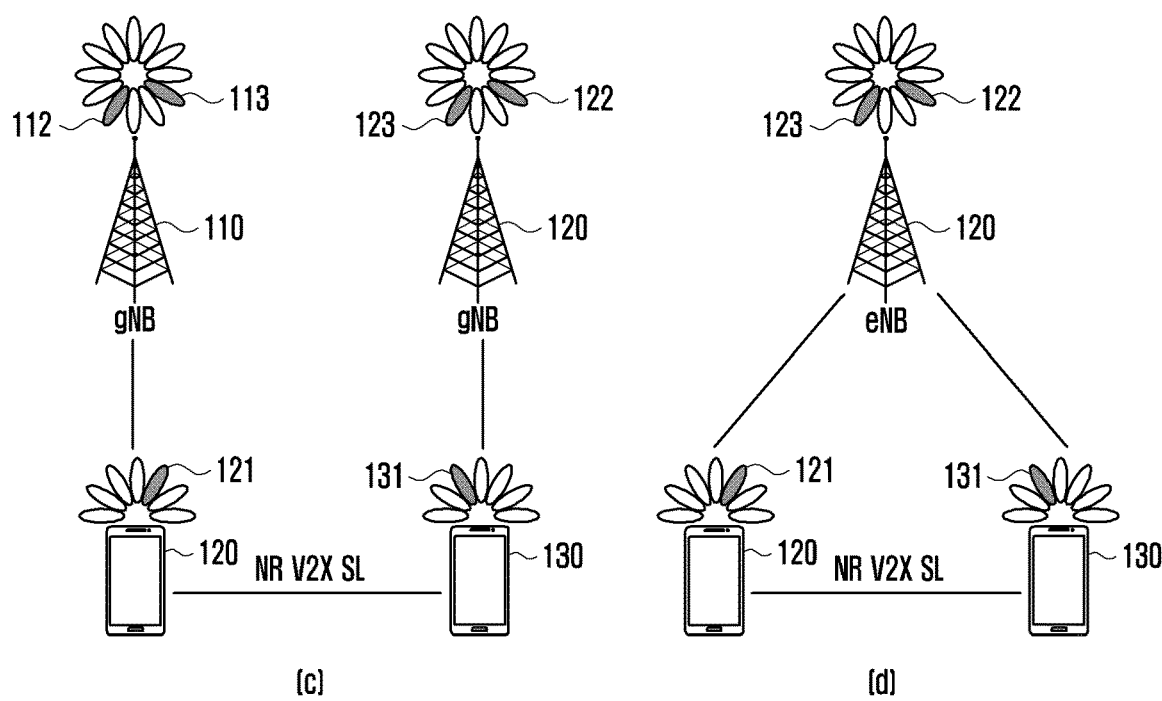

FIG. 5A illustrates a scenario in which terminals with a gNB coverage perform direct communication. In FIG. 5A, configuration parameter information used for determining whether to transmit feedback signaling for a sidelink radio bearer to be used for transmission or reception of a V2X packet, based on unicast, broadcast, and groupcast between terminals may be previously configured or may be transmitted through an RRC dedicated message or a system information message of a gNB. A terminal that performs direct communication may transmit QoS information corresponding to a V2X service to a base station, and may acquire configuration parameter information used for determining whether to transmit feedback signaling for a sidelink radio bearer, from the base station. A terminal that performs direct communication may determine QoS information corresponding to a V2X service, and may acquire a parameter used for determining whether to transmit feedback signaling for a sidelink radio bearer, from pre-configured information.

FIG. 5B illustrates a scenario in which terminals with an ng-eNB coverage perform direct communication. In FIG. 5B, configuration parameter information of a sidelink radio bearer to be used for transmission or reception of a V2X packet, based on unicast, groupcast, or broadcast between terminals may be previously configured or may be transmitted through an RRC dedicated message or a system information message of an ng-eNB. A terminal that performs direct communication may transmit QoS information corresponding to a V2X service to the ng-eNB, and may acquire configuration parameter information used for determining whether to transmit feedback signaling for a sidelink radio bearer, from the base station. A terminal that performs direct communication may determine QoS information corresponding to a V2X service, and may acquire a parameter used for determining whether to transmit feedback signaling for a sidelink radio bearer, from pre-configured information.

FIG. 5C illustrates a scenario in which a terminal 120 within a gNB coverage and a terminal 130 within an eNB coverage perform direct communication. Configuration parameter information of a sidelink radio bearer to be used for transmission or reception of a V2X packet, based on unicast, groupcast, or broadcast between the terminals may be previously configured or may be transmitted through an RRC dedicated message or a system information message of a gNB. A terminal that performs direct communication may transmit QoS information corresponding to a V2X service to the gNB, and may acquire configuration parameter information used for determining whether to transmit feedback signaling for a sidelink radio bearer, from the base station. A terminal that performs direct communication may determine QoS information corresponding to a V2X service, and may acquire a parameter used to transmit feedback signaling for a sidelink radio bearer, from pre-configured information.

FIG. 5D illustrates a scenario in which terminals with an eNB coverage perform direct communication. Configuration parameter information of a sidelink radio bearer to be used for transmission or reception of a V2X packet, based on unicast, groupcast, or broadcast between the terminals may be previously configured or may be transmitted through an RRC dedicated message or a system information message of a eNB. A terminal that performs direct communication may determine QoS information corresponding to a V2X service, and may acquire configuration parameter information used for determining whether to transmit feedback signaling for a sidelink radio bearer, from the base station. A terminal that performs direct communication may determine QoS information corresponding to a V2X service, and may acquire a parameter used to transmit feedback signaling for a sidelink radio bearer, from pre-configured information.

According to various embodiments of the disclosure, a method for acquiring sidelink QoS information related to a sidelink performing a device-to-device communication, and acquiring a configuration parameter used to transmit feedback signaling for a sidelink radio bearer corresponding to QoS may be used in unicast V2X message transmission or reception, broadcast V2X message transmission or reception, or groupcast V2X message transmission or reception. According to various embodiments of the disclosure, a configuration parameter used for transmitting feedback signaling for a sidelink radio bearer which performs a device-to-device communication may be acquired by at least one of a method for acquiring a configuration parameter from a base station, a method for acquiring pre-configured information by a terminal, and a method for randomly configuring a configuration parameter by a terminal.

According to various embodiments of the disclosure, a configuration for determining transmission of feedback signaling may be determined by at least one or a combination of the following items.

(1) Whether to transmit feedback signaling may be designated for each cell. For example, if feedback signaling is configured to be transmitted in cell A, a terminal performing a device-to-device communication in cell A may transmit feedback signaling. For example, if feedback signaling is configured not to be transmitted in cell B, a terminal performing a device-to-device communication in cell B may not transmit feedback signaling. Whether a terminal transmits feedback signaling in a corresponding cell follows an indicator transmitted by a base station.

(2) Whether to transmit feedback signaling may be designated for each zone. Zones may be operated independently from cells. A terminal may determine a zone, based on the terminal's location information. If feedback signaling is configured to always be able to be transmitted in zone A, a terminal performing a device-to-device communication in zone A may transmit feedback signaling. If feedback signaling is configured not to be transmitted in zone B, a terminal performing a device-to-device communication in zone B may not transmit feedback signaling. Whether a terminal transmits feedback signaling in a corresponding zone may follow an indicator transmitted by a base station, or follow indication information which is previously configured in the terminal.

(3) Whether to transmit feedback signaling may be designated for each group. If feedback signaling for a device-to-device communication is configured to be transmitted in group A, a terminal in group A may transmit feedback signaling. If feedback signaling for a device-to-device communication is configured not to be transmitted in group B, a terminal in group B may not transmit feedback signaling. A terminal may acquire indication information indicating whether to transmit feedback signaling, through group configuration information. The group configuration information is received from a base station, is received from a terminal belonging to a group, or is previously configured. The group configuration information including indication information indicating whether to transmit feedback signaling may be transmitted to terminals in a group through one-time signaling.

(4) Whether to transmit feedback signaling may be configured for each V2X application. For example, if feedback signaling for application A is configured to be transmitted, when a device-to-device communication for application A is performed, a terminal may always transmit feedback signaling. If feedback signaling for application B is configured not to be transmitted, when a device-to-device communication for application B is performed, a terminal may not always transmit feedback signaling. A terminal may receive, from a base station, information on a V2X application for which feedback signaling is to be transmitted, and information on a V2X application for which feedback signaling is not to be transmitted, or the same information may be previously configured for the terminal. Alternatively, the terminal may acquire information indicating whether to transmit feedback signaling with respect to a V2X application at a higher layer (e.g., an application layer, or a V2X layer) of the terminal.

(5) Feedback signaling is configured to be transmitted in order to satisfy a reliability requirement for a V2X application. For example, if a reliability requirement is indicated for a V2X application, it may be configured that feedback signaling for a corresponding application packet is to be transmitted. As another example, if a reliability requirement for a V2X application is indicated to satisfy a particular threshold or higher, it may be configured that feedback signaling for a corresponding application packet is to be transmitted. As another example, if a reliability requirement for a V2X application is indicated to be satisfied preferentially to a latency requirement, it may be configured that feedback signaling for a corresponding application packet is to be transmitted.

(6) Feedback signaling is configured not to be transmitted in order to satisfy a latency requirement for a V2X application. For example, if a latency requirement is indicated for a V2X application, it may be configured that feedback signaling for a corresponding application packet is not to be transmitted. As another example, if a latency requirement for a V2X application is indicated to satisfy a particular threshold or higher, it may be configured that feedback signaling for a corresponding application packet is not to be transmitted. As another example, if a latency requirement for a V2X application is indicated to be satisfied preferentially to a reliability requirement, it may be configured that feedback signaling for a corresponding application packet is not to be transmitted.

A relation between whether to transmit feedback signaling and a reliability requirement or a latency requirement is as follows. If it is possible to transmit feedback signaling, whether reception of a packet fails may be determined, and the packet may be retransmitted. Therefore, reliability may be enhanced. If it is possible to transmit feedback signaling, it may take time to determine whether reception of a packet fails, and retransmit the packet. Therefore, latency may be increased. If it is not possible to transmit feedback signaling, there is no need to determine whether reception of a packet fails, and retransmission of the packet is not also required. Therefore, latency may not be increased. If it is not possible to transmit feedback signaling, there is no need to determine whether reception of a packet fails, and the packet is not retransmitted. Therefore, reliability may be decreased.

According to an embodiment of the disclosure, a parameter indicating a reliability requirement value may be configured as ProSe 5QI Reliability (PQI_R). The PQI_R may indicate a reliability level required for a V2X application. The PQI_R may correspond to a parameter managed at a higher layer (e.g., an application layer or a V2X layer) of a terminal.

According to an embodiment of the disclosure, a parameter indicating a latency requirement value may be configured as ProSe 5QI Latency (PQI_L). The PQI_L may indicate a latency level required for a V2X application. The PQI_L may correspond to a parameter managed at a higher layer (e.g., an application layer or a V2X layer) of a terminal.

A QoS requirement (ProSe QoS Indicator; PQI) of a V2X service/application according to an embodiment of the disclosure may be represented by a standardized 5QI value defined in a 3GPP standard as shown in [Table 1]. For example, a case where a parameter indicating a reliability requirement value or a latency requirement value is operated to correspond to a packet error rate or a packet delay budget of 5QI defined in [Table 1], respectively, may be considered. A terminal may configure a reliability requirement value or a latency requirement value required in a V2X service, based on a 5QI value.

TABLE 1

| 5QI value | Resource Type | Default Priority Level | Packet Delay Budget | Packet Error Rate | Default Maximum Data Burst Volume | Default Averaging Window | Example Services |
|---|---|---|---|---|---|---|---|
| 82 | Delay Critical GBR | 19 | 10 ms | $10^{-4}$ | 255 bytes | 2000 ms | Discrete Automation (see TS 22.261 [22]) |
| 83 | | 22 | 10 ms | $10^{-4}$ | 1354 bytes (NOTE 3) | 2000 ms | Discrete Automation (see TS 22.261 [22]), eV2X Messages (Platooning, Cooperative Lane Change with low LoA; see TS 22.186 [4]) |
| 84 | | 24 | 30 ms | $10^{-5}$ | 1354 bytes | 2000 ms | Intelligent transport systems (see TS 22.261 [22]) |
| 85 | | 21 | 5 ms | $10^{-5}$ | 255 bytes | 2000 ms | Electricity Distribution-high voltage (see TS 22.261 [22]), Remote Driving (see TS 22.186 [4]) |
| 100 | | 18 | 5 ms | $10^{-4}$ | 1354 bytes | 2000 ms | eV2X messages (Collision Avoidance, Platooning with high LoA (see TS 22.186 [4]) |

In an embodiment of the disclosure, a terminal may provide, to a base station, a reliability requirement value or a latency requirement value for a radio bearer corresponding to a V2X application, the value corresponding to the 5QI value. The terminal and the base station may acquire information on a reliability requirement value or a latency requirement value corresponding to a 5QI value from a V2X server.

In another embodiment of the disclosure, a terminal may provide, to a base station, a reliability requirement value (PQI_R) or a latency requirement value (PQI_L) for a radio bearer corresponding to a V2X application.

A parameter used for determining whether to transmit feedback signaling includes at least one of a feedback signaling transmission/feedback signaling non-transmission indicator (HARQ feedback enabled/disabled indicator), a reliability threshold, or a latency threshold. If a feedback signaling transmission indicator is configured, a terminal may transmit or receive a feedback signal for a packet transmitted in a direct communication scheme. If a feedback signaling non-transmission indicator is configured, a terminal may not transmit or receive a feedback signal for a packet transmitted in a direct communication scheme. If a reliability threshold or a latency threshold is configured, a terminal may determine, according to at least one or a combination of the conditions in [Table 2] below, that the terminal may transmit or receive a feedback signal or may not transmit or receive a feedback signal with respect to a packet transmitted in a direct communication scheme.

TABLE 2

Condition (a): a reliability requirement value (PQI_R) higher than a reliability threshold
Condition (b): a latency requirement value (PQI_L) higher than a latency threshold
Condition (c): a reliability requirement value higher than reliability threshold_1, or a latency requirement value lower than latency threshold_1
Condition (d): a reliability requirement value lower than reliability threshold_1, or a latency requirement value higher than latency threshold_1

Examples of a terminal operation for the above conditions are as follows. Various combinations of conditions are also possible other than the following examples.

If condition (a) is satisfied, feedback signaling is transmitted
If condition (b) is satisfied, feedback signaling is not transmitted
If condition (a) is satisfied and condition (b) is not satisfied, feedback signaling is transmitted
If condition (a) is not satisfied and condition (b) is satisfied, feedback signaling is not transmitted
If condition (c) is satisfied, feedback signaling is transmitted
If condition (d) is satisfied, feedback signaling is not transmitted
If condition (e) is satisfied, feedback signaling is transmitted
If condition (h) is satisfied, feedback signaling is transmitted
If condition (e) is satisfied and condition (a) is satisfied, feedback signaling is transmitted
If condition (f) is satisfied and condition (b) is satisfied, feedback signaling is not transmitted The parameter used for determining whether to transmit feedback signaling may be configured through Uu signaling between a terminal and a base station, may be previously configured for the terminal through pre-configuration, or may be configured through sidelink signaling between terminals.

Classification based on RRC connection state of a terminal
  an RRC_Connected UE acquires through RRC dedicated signaling of a base station (e.g., RRC Reconfiguration)
  an RRC_Idle/RRC_Inactive UE acquires from a V2X SIB
  an RRC_Idle/RRC_Inactive UE may also acquire through RRC dedicated signaling of a base station.
  an Out-of-coverage UE acquires through pre-configuration
  A method for using signaling in a device-to-device communication (a method in which a transmission terminal informs a reception terminal, or terminals belonging to a group inform each other)
  PC5 RRC signaling (e.g., AS configuration or SLRB configuration)
  PC5 MAC signaling (e.g., a MAC CE defined for PC5 configuration)
  PC5 PHY signaling (PSCCH SCI)

Next, referring to FIG. 6A and FIG. 6B, a method for configuring, for a terminal in an RRC-CONNECTED state, a parameter for determining whether to transmit feedback signaling in a device-to-device communication will be described.

Figure 6A:
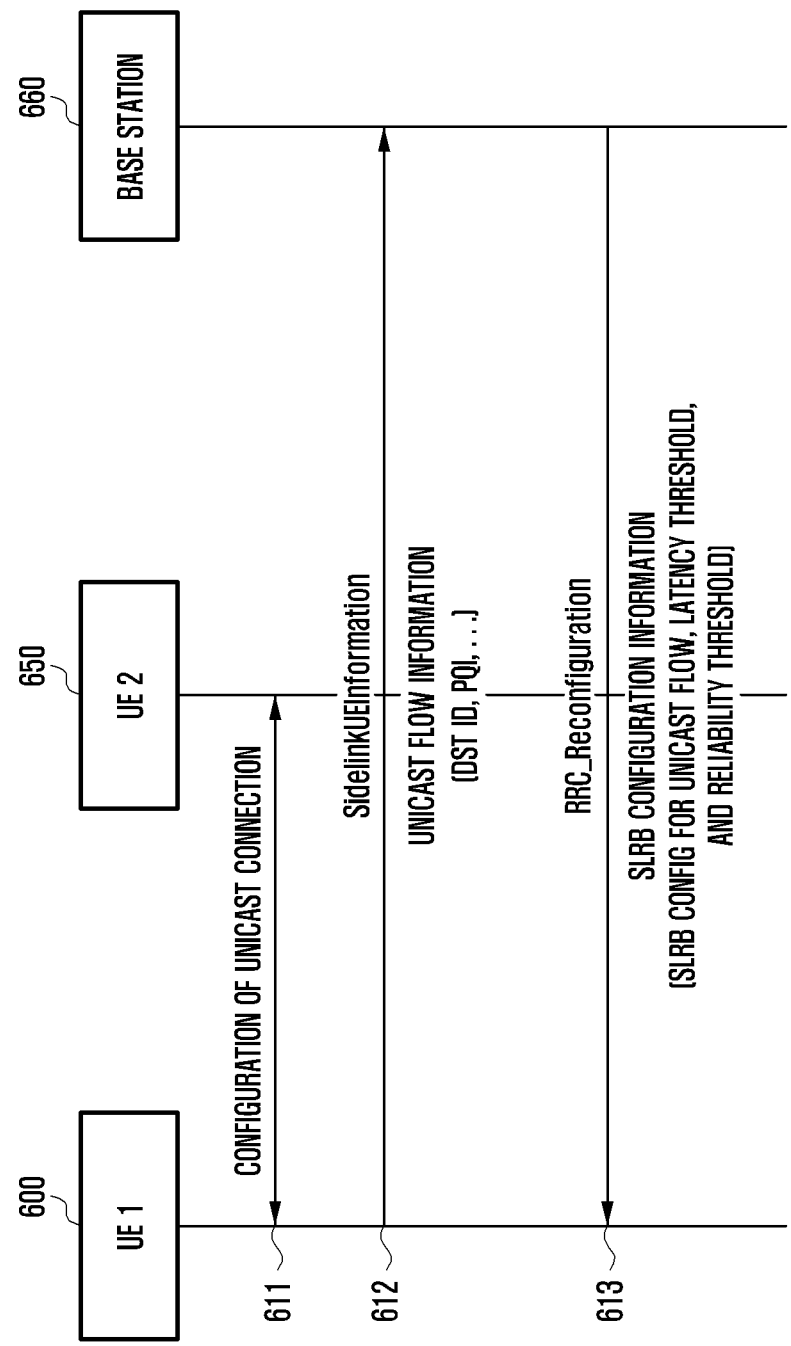
FIG. 6A illustrates a signaling procedure for configuring, for a terminal in an RRC-CONNECTED state, a parameter for determining whether to transmit feedback signaling in a device-to-device communication according to various embodiments of the disclosure.

Referring to FIG. 6A, UE1 600 and UE2 650 may transmit or receive a V2X packet through a unicast-based device-to-device communication. UE1 600 and UE2 605 may configure a PC5 unicast connection therefor in operation 611. UE1 600 may transmit a SidelinkUEInformation message including unicast flow information to a base station in operation 612. Operation 612 may correspond to an operation of requesting sidelink radio bearer (SLRB) configuration information required for a device-to-device communication, and according to an embodiment of the disclosure, the operation may be used to request configuration information for determining whether there is a need to perform feedback signaling for a corresponding flow. Information which may be included in signaling of operation 612 may include at least one in [Table 3] below.

TABLE 3

A list of destination (DST) IDs corresponding to a V2X application
  If a DST ID is distinguishable in unicast, groupcast, and broadcast, only the DSI ID may be included.
  If a DST ID is not distinguishable in unicast, groupcast, and broadcast, the DST ID may be included together with a cast type indicator.
A PQI, a PQI_L, or a PQI_R corresponding to a DST ID: requirement value information of a V2X application
  If flow-based QoS modelling is applied in a sidelink
    a flow identifier (QFI) and a corresponding PQI
    a flow identifier (QFI) and a corresponding PQI_R or PQI_L
  If packet-based QoS modelling is applied in a sidelink
    a PQI (if the PQI is included in a packet to be transmitted)
    a PQI_R or PQI_L (the PQI_R or PQI_L is included in a packet to be transmitted)

In a system in which the base station already has requirement value information corresponding to a V2X application, a PQI, a PQI_L, or a PQI_R may not be included in operation 612.

When the base station receives information on a V2X application in operation 612, the base station may transmit, to the terminal, configuration information allowing determination on whether to perform feedback signaling for a packet belonging to the V2X application, in operation 613. Operation 613 may correspond to an operation of providing a SLRB configuration required for a device-to-device communication, and in an embodiment of operation 613, the configuration information may include threshold information allowing determination on whether to perform feedback signaling. The threshold information for determination on whether to perform feedback signaling corresponding to the V2X application may include at least one in [Table 4] below.

TABLE 4

Reliability threshold
Latency threshold
The reliability threshold or latency threshold corresponds to application information (DST ID)
   If a cast type is distinguishable by a DST ID, only the DST ID may be included.
   If a cast type is not distinguishable by a DST ID, a cast type indicator may also be included together with the DST ID.
The reliability threshold or latency threshold corresponds to sidelink flow information or sidelink packet information
   The sidelink flow information includes at least one of a QFI, a PQI, a PQI_L, and a PQI_R
   The sidelink packet information includes at least one of a PQI, a PQI_L, and a PQI_R
The reliability threshold or latency threshold corresponds to SLRB information The terminal having received configuration information (a threshold) allowing determination on whether to transmit feedback signaling, in operation 613, may determine whether to transmit feedback signaling by comparing the configuration information and a reliability requirement value or a latency requirement value of a packet (or a flow). A condition to determine whether to transmit feedback signaling is as shown in [Table 2] above.

Referring to FIG. 6B, UE1 600 and UE2 650 may transmit or receive a V2X packet through a unicast-based device-to-device communication. UE1 600 and UE2 650 may configure a PC5 unicast connection therefor in operation 621. UE1 600 may transmit a SidelinkUEInformation message including unicast flow information to a base station 660 in operation 622. Operation 622 may correspond to an operation of requesting SLRB configuration information required for a device-to-device communication, and according to an embodiment of the disclosure, the operation may be used to request configuration information for determining whether there is a need to perform feedback signaling for a corresponding flow. Information which may be included in signaling of operation 622 may include at least one in [Table 3] above.

In a system in which the base station 660 already has requirement value information corresponding to a V2X application, a PQI, a PQI_L, or a PQI_R may not be included in operation 622.

When the base station 660 receives information on a V2X application in operation 622, the base station may transmit, to the terminal, configuration information allowing determination on whether to perform feedback signaling for a packet belonging to the V2X application, in operation 623. Operation 623 may correspond to an operation of providing a SLRB configuration required for a device-to-device communication, and in an embodiment of operation 623, the configuration information may include indicator information allowing determination on whether to perform feedback signaling. In an embodiment of FIG. 6B, the base station 660 may determine whether to perform feedback signaling, based on requirement value information corresponding to a V2X application, and may configure an indicator.

The indicator information for determination on whether to perform feedback signaling corresponding to the V2X application may include at least one in [Table 5] below.

TABLE 5

An HARQ feedback enabled/disabled indicator corresponding to application information (a DST ID)
   If a cast type is distinguishable by a DST ID, only the DST ID may be included.
   If a cast type is not distinguishable by a DST ID, a cast type indicator may also be included together with the DST ID.
An HARQ feedback enabled/disabled indicator corresponding to sidelink flow information or sidelink packet information
   The sidelink flow information includes at least one of a QFI, a PQI, a PQI_L, and a PQI_R
   The sidelink packet information includes at least one of a PQI, a PQI_L, and a PQI_R
An HARQ feedback enabled/disabled indicator corresponding to SLRB information The terminal having received configuration information (an indicator) allowing determination on whether to transmit feedback signaling, in operation 623, may determine whether to transmit feedback signaling for a packet (or a flow), based on the configuration information. In an embodiment, the terminal may follow, without change, configuration information on whether to transmit feedback signaling, which is determined by the base station 660. In another embodiment, the terminal may determine whether to transmit feedback signaling, by considering sidelink state information and configuration information on whether to transmit feedback signaling, which is determined by the base station 660.

Next, referring to FIG. 7A to FIG. 7E, a method for configuring, for a terminal in an RRC IDLE state or a terminal in an RRC INACTIVE state, a parameter for determining whether to transmit feedback signaling in a device-to-device communication will be described.

Referring to FIG. 7A, UE1 700 and UE2 750 may transmit or receive a V2X packet through a unicast-based device-to-device communication. UE1 700 and UE2 750 may configure a PC5 unicast connection therefor in operation 701. UE1 700 may receive a V2X system information block (SIB) message transmitted by a base station 760, in operation 702. The V2X SIB message may include SLRB configuration information required for a device-to-device communication, and according to an embodiment of the disclosure, the message may be used to transmit configuration information for determining whether there is a need to perform feedback signaling for a sidelink flow or a sidelink packet corresponding to a V2X application. Information which may be included in signaling of operation 702 may include at least one in [Table 4] above. The terminal having received configuration information (a threshold) allowing determination on whether to transmit feedback signaling, in operation 702, may determine whether to transmit feedback signaling by comparing the configuration information and a reliability requirement value or a latency requirement value of a packet (or a flow). A condition to determine whether to transmit feedback signaling is as shown in [Table 2] above.

Referring to FIG. 7B, UE1 700 and UE2 750 may transmit or receive a V2X packet through a unicast-based device-to-device communication. UE1 700 and UE2 750 may configure a PC5 unicast connection therefor in operation 711. UE1 700 may receive a V2X SIB message transmitted by a base station 760, in operation 712. The V2X SIB message may include SLRB configuration information required for a device-to-device communication, and according to an embodiment of the disclosure, the message may be used to transmit configuration information for determining whether there is a need to perform feedback signaling for a sidelink flow or a sidelink packet corresponding to a V2X application. In an embodiment of the operation 712, the configuration information may include indicator information allowing determination on whether to perform feedback signaling. In an embodiment of FIG. 7B, the base station 760 may determine whether to perform feedback signaling, based on requirement value information corresponding to a V2X application, and may configure an indicator. The indicator information for determination on whether to perform feedback signaling corresponding to the V2X application may include at least one in [Table 5] above.

The terminal having received configuration information (an indicator) allowing determination on whether to transmit feedback signaling, in operation 712, may determine whether to transmit feedback signaling for a packet (or a flow), based on the configuration information. In an embodiment, the terminal may follow, without change, configuration information on whether to transmit feedback signaling, which is determined by the base station 760. In another embodiment, the terminal may determine whether to transmit feedback signaling, by considering sidelink state information and configuration information on whether to transmit feedback signaling, which is determined by the base station 760.

In another embodiment of configuring, for an RRC_IDLE terminal or a RRC_INACTIVE terminal, whether to transmit feedback signaling corresponding to a V2X application, the base station 760 may indicate, using RRC dedicated signaling, configuration information to be used by a terminal after a transition from an RRC_CONNECTED state to an RRC_IDLE state or an RRC_INACTIVE state. An embodiment of providing, through RRC dedicated signaling, configuration information for determination on whether to transmit feedback signaling, which is to be used in an RRC_IDLE state or an RRC_INACTIVE state, will be described with reference to FIG. 7C to FIG. 7E.

Figure 7C:
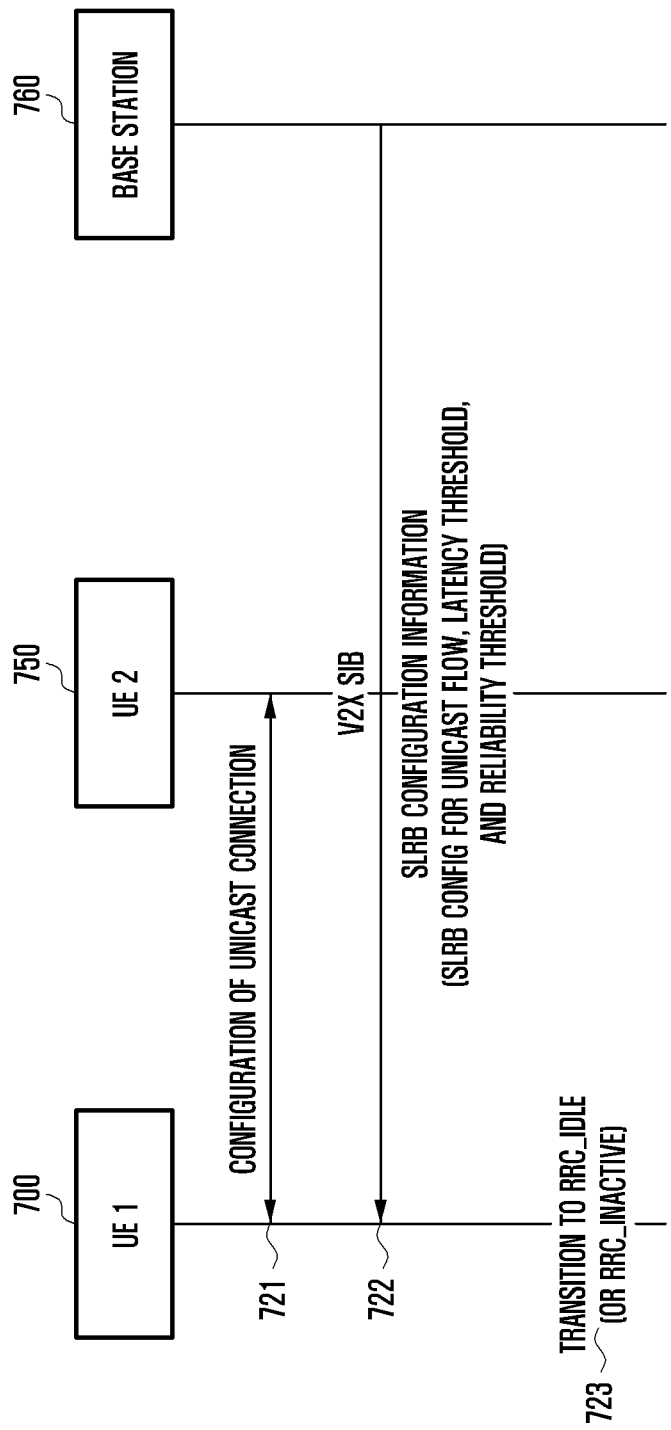
FIG. 7C illustrates a signaling procedure for configuring, for a terminal in an RRC-IDLE state or a terminal in an RRC-INACTIVE state, a parameter for determining whether to transmit feedback signaling in a device-to-device communication according to various embodiments of the disclosure.

Referring to FIG. 7C, UE1 700 and UE2 750 may transmit or receive a V2X packet through a unicast-based device-to-device communication. UE1 700 and UE2 750 may configure a PC5 unicast connection therefor in operation 721. A base station 760 may indicate an RRC_CONNECTED terminal to transition to an RRC_IDLE state or an RRC_INACTIVE state by transmitting RRC release signaling. According to an embodiment of the disclosure, the RRC release signaling of operation 722 may include SLRB configuration information required for direct communication of a terminal, and may be used to transmit configuration information for determining whether there is a need to perform feedback signaling for a sidelink flow or a sidelink packet corresponding to a V2X application. Information which may be included in RRC release signaling of operation 722 may include at least one in [Table 4] above.

The terminal having received RRC release signaling of operation 722 may transition to an RRC_IDLE state or an RRC_INACTIVE state, and when a device-to-device communication is performed in the RRC_IDLE state or the RRC_INACTIVE state, the terminal may determine whether to transmit feedback signaling by comparing a reliability requirement value or a latency requirement value of a packet (or a flow), based on the configuration information (threshold) allowing determination on whether to transmit feedback signaling, which is received in the operation 722. A condition to determine whether to transmit feedback signaling is as shown in [Table 2] above.

According to an embodiment of the disclosure, the configuration information allowing determination on whether to transmit feedback signaling, which is received in the operation 722, may be applied to only a new V2X application except for a V2X application which has been used by the terminal in the RRC_CONNECTED state. According to another embodiment, the configuration information allowing determination on whether to transmit feedback signaling, which is received in the operation 722, may be applied to a new V2X application and a V2X application which has been used by the terminal in the RRC_CONNECTED state.

Referring to FIG. 7D, UE1 700 and UE2 750 may transmit or receive a V2X packet through a unicast-based device-to-device communication. UE1 700 and UE2 750 may configure a PC5 unicast connection therefor in operation 731. A base station 760 may indicate an RRC_CONNECTED terminal to transition to an RRC_IDLE state or an RRC_INACTIVE state by transmitting RRC release signaling. According to an embodiment of the disclosure, the RRC release signaling of operation 732 may include SLRB configuration information required for direct communication of a terminal, and may be used to transmit configuration information for determining whether there is a need to perform feedback signaling for a sidelink flow or a sidelink packet corresponding to a V2X application. In an embodiment of the operation 732, the configuration information may include indicator information allowing determination on whether to perform feedback signaling. In an embodiment of FIG. 7D, the base station 760 may determine whether to perform feedback signaling, based on requirement value information corresponding to a V2X application, and may configure an indicator. The indicator information for determination on whether to perform feedback signaling corresponding to the V2X application may include at least one in [Table 5] above.

The terminal having received RRC release signaling of operation 732 may transition to an RRC_IDLE state or an RRC_INACTIVE state, and when a device-to-device communication is performed in the RRC_IDLE state or the RRC_INACTIVE state, the terminal may determine whether to transmit feedback signaling for a packet (or a flow), based on the configuration information (an indicator) allowing determination on whether to transmit feedback signaling, which is received in the operation 732. In an embodiment, the terminal may follow, without change, configuration information on whether to transmit feedback signaling, which is determined by the base station 760. In another embodiment, the terminal may determine whether to transmit feedback signaling, by considering sidelink state information and configuration information on whether to transmit feedback signaling, which is determined by the base station 760.

According to an embodiment of the disclosure, the configuration information allowing determination on whether to transmit feedback signaling, which is received in the operation 732, may be applied to only a new V2X application except for a V2X application which has been used by the terminal in the RRC_CONNECTED state. According to another embodiment, the configuration information allowing determination on whether to transmit feedback signaling, which is received in the operation 732, may be applied to a new V2X application and a V2X application which has been used by the terminal in the RRC_CONNECTED state.

Figure 7E:
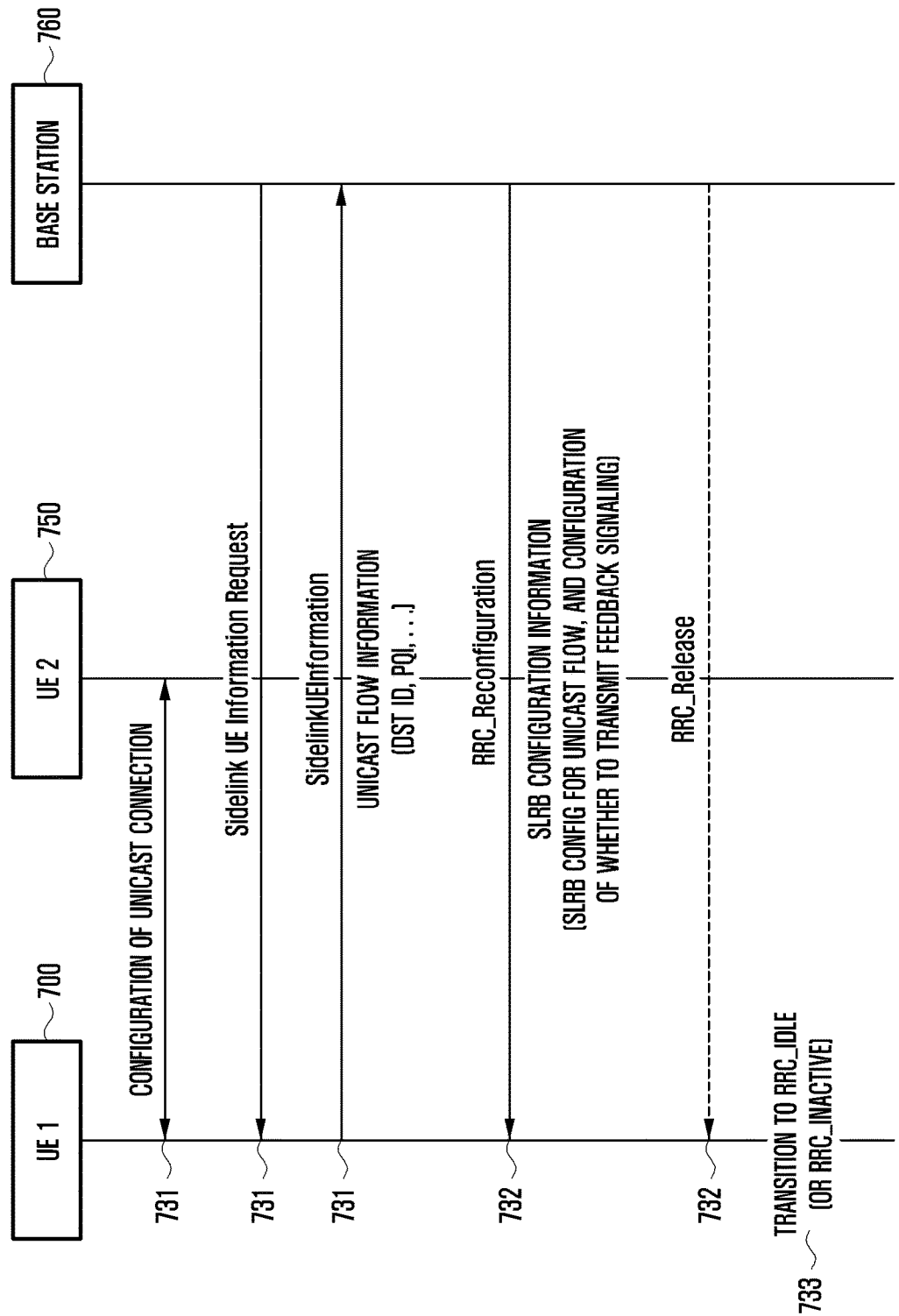
FIG. 7E illustrates a signaling procedure for configuring, for a terminal in an RRC-IDLE state or a terminal in an RRC-INACTIVE state, a parameter for determining whether to transmit feedback signaling in a device-to-device communication according to various embodiments of the disclosure.

Referring to FIG. 7E, UE1 700 and UE2 750 may transmit or receive a V2X packet through a unicast-based device-to-device communication. UE1 700 and UE2 750 may configure a PC5 unicast connection therefor in operation 741. In another embodiment of providing configuration information to be used to determine whether to transmit feedback signaling with respect to a V2X application to be used by a terminal in an RRC_IDLE state or an RRC_INACTIVE state, a base station 760 may indicate an RRC_CONNECTED terminal to report information on a V2X application in operation 742. The terminal may transmit information on a V2X application to the base station 760 in operation 743 as in an embodiment of FIG. 6A or FIG. 6B. The base station 760 may provide configuration information on whether to transmit feedback signaling corresponding to the V2X application in operation 744 as in an embodiment of FIG. 6A or FIG. 6B. The base station 760 may transmit an RRC release message to allow the terminal to transition to an RRC_IDLE state or an RRC_INACTIVE state, in operation 745. According to various embodiments, operation 745 may be omitted, or signaling of operation 744 and signaling of operation 745 may be combined. The terminal may determine whether to transmit feedback signaling for a flow/packet of a device-to-device communication-based V2X application performed in the RRC_IDLE state or the RRC_INACTIVE state, based on the configuration information received in operation 744.

According to an embodiment of the disclosure, the configuration information allowing determination on whether to transmit feedback signaling, which is received in the operation 744, may be applied to only a new V2X application except for a V2X application which has been used by the terminal in the RRC_CONNECTED state. According to another embodiment, the configuration information allowing determination on whether to transmit feedback signaling, which is received in the operation 744, may be applied to a new V2X application and a V2X application which has been used by the terminal in the RRC_CONNECTED state.

According to an embodiment of the disclosure, in a case where configuration information on whether to transmit feedback signaling corresponding to a V2X application is acquired through a V2X SIB message, and is acquired through RRC dedicated signaling, a terminal may be operated based on configuration information acquired through RRC dedicated signaling.

Next, referring to FIG. 8A and FIG. 8B, a method for configuring, for a terminal in an OUT-OF-COVERAGE state, a parameter for determining whether to transmit feedback signaling in a device-to-device communication will be described.

Figure 8A:
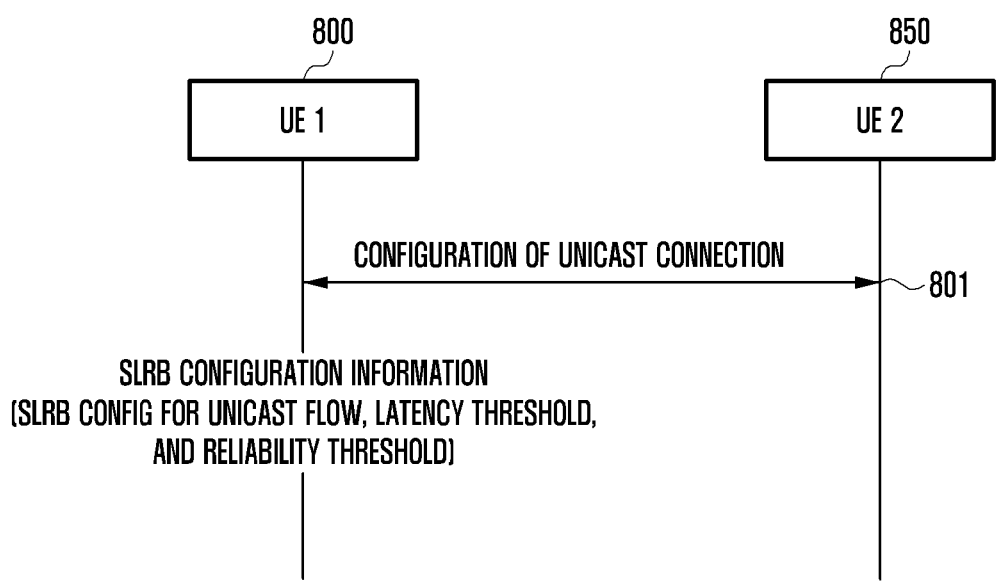
FIG. 8A illustrates a signaling procedure for configuring, for a terminal in an OUT-OF-COVERAGE state, a parameter for determining whether to transmit feedback signaling in a device-to-device communication according to various embodiments of the disclosure.

Referring to FIG. 8A, UE1 800 and UE2 850 may transmit or receive a V2X packet through a unicast-based device-to-device communication. UE1 800 and UE2 850 may configure a PC5 unicast connection therefor in operation 801. A terminal may perform a device-to-device communication by using configuration information pre-configured for a V2X application, in operation 802. The pre-configured configuration information may include configuration information for determining whether there is a need to perform feedback signaling for a sidelink flow or a sidelink packet corresponding to a V2X application, according to an embodiment of the disclosure. The information which is pre-configured for determining whether there is a need to perform feedback signaling may include at least one in [Table 4] above. The terminal may determine whether to transmit feedback signaling by comparing a reliability requirement value or a latency requirement value of a packet (or a flow), based on configuration information (a threshold) allowing determination on whether to transmit feedback signaling, in operation 802. A condition to determine whether to transmit feedback signaling is as shown in [Table 2] above.

Figure 8B:
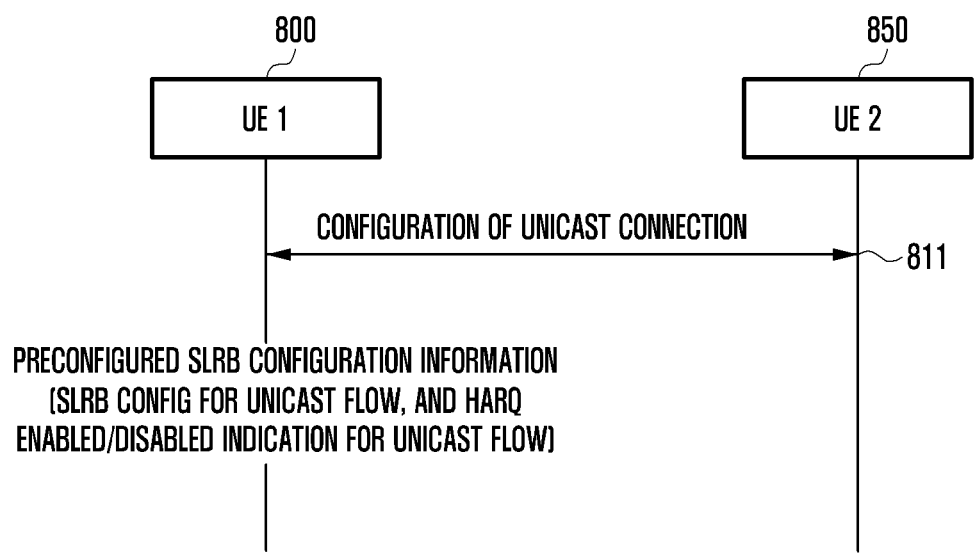
FIG. 8B illustrates a signaling procedure for configuring, for a terminal in an OUT-OF-COVERAGE state, a parameter for determining whether to transmit feedback signaling in a device-to-device communication according to various embodiments of the disclosure.

Referring to FIG. 8B, UE1 800 and UE2 850 may transmit or receive a V2X packet through a unicast-based device-to-device communication. UE1 800 and UE2 850 may configure a PC5 unicast connection therefor in operation 811. A terminal may perform a device-to-device communication by using configuration information pre-configured for a V2X application, in operation 812. The pre-configured configuration information may include configuration information for determining whether there is a need to perform feedback signaling for a sidelink flow or a sidelink packet corresponding to a V2X application, according to an embodiment of the disclosure. The information which is pre-configured for determining whether there is a need to perform feedback signaling may include at least one in [Table 5] above. The terminal may determine whether to transmit feedback signaling for a packet (or a flow), based on configuration information (an indicator) allowing determination on whether to transmit feedback signaling, in operation 812.

According to an embodiment of the disclosure, in a case where configuration information on whether to transmit feedback signaling corresponding to a V2X application is acquired through pre-configuration, and is acquired through signaling from a base station, a terminal may be operated based on configuration information acquired through signaling of the base station.

Next, referring to FIGS. 9A to 9C, a method for configuring a parameter for determining whether to transmit feedback signaling between terminals which perform V2X packet transmission or reception based on direct communication will be described.

Configuration information for determining whether to transmit feedback signaling for a sidelink flow or a sidelink packet, which is proposed in the disclosure, may be exchanged between terminals through signaling. The configuration information for determining whether to transmit feedback signaling may be transmitted by a transmission terminal to a reception terminal. The configuration information may be transmitted by a group leader terminal to a group member terminal. The configuration information transmitted or received between terminals may include at least one of the parameters shown in [Table 6] or [Table 7]. Determination on whether to transmit feedback signaling may be performed by a terminal or a base station or according to pre-configured information, based on a method of FIG. 6A to FIG. 8B.

Signaling between terminals, used to transmit or receive the configuration information may include at least one of the following signalings.

(1) PC5 RRC signaling transmitted between terminals (e.g., an AS configuration, an SLRB configuration, an SL SIB, or an SL MIB)

(2) PC5 MAC signaling transmitted between terminals (e.g., sidelink MAC CE)

(3) PC5 PHY signaling transmitted between terminals (e.g., a PSCCH or sidelink control information)

In another embodiment, terminals performing direct communication may acquire feedback signaling transmission information without separate signaling between the terminals. According to an embodiment of the disclosure, in relation to sidelink logical channel IDs (LCIDs) corresponding to an SLRB of a sidelink flow or a sidelink packet, a sidelink LCID for which feedback signaling is transmittable and a sidelink LCID for which feedback signaling is not to be transmitted may be previously configured. For example, SL LCID number 4 to SL LCID number 10 may be configured to be sidelink LCIDs for which feedback signaling is to be transmitted, and SL LCID number 11 to SL LCID number 20 may be configured to be sidelink LCIDs for which feedback signaling is not to be transmitted. A transmission terminal and a reception terminal may determine whether to transmit feedback signaling, based on LCID information of the SLRB. According to an embodiment of the disclosure, in relation to hybrid automatic repeat request (HARQ) process IDs corresponding to an SLRB of a sidelink flow or a sidelink packet, a sidelink HARQ process ID for which feedback signaling is transmittable and a sidelink HARQ process ID for which feedback signaling is not to be transmitted may be previously configured.

The information in [Table 6] may be included in PC5 RRC signaling or PC5 MAC signaling described above, and then transmitted.

TABLE 6

A list of DST IDs corresponding to a V2X application
   If a cast type is distinguishable by a DST ID, only the DST ID may be included.
   If a cast type is not distinguishable by a DST ID, a cast type indicator may also be included together with the DST ID.
Sidelink flow information or sidelink packet information
   The sidelink flow information includes at least one of a QFI, a PQI, a PQI_L, and a PQI_R
   The sidelink packet information includes at least one of a PQI, a PQI_L, and a PQI_R
HARQ process ID list
Logical channel ID list
Logical channel group list
SLRB list
An indicator indicating whether to transmit feedback signaling (HARQ feedback enabled/disabled indicator)
A threshold allowing determination on whether to transmit feedback signaling (a reliability threshold or a latency threshold)

The information in [Table 7] may be included in a physical sidelink control channel (PSCCH) or sidelink control information (SCI), and then transmitted.

TABLE 7

An indicator indicating whether to transmit feedback signaling (HARQ feedback enabled/disabled indicator)
A reliability requirement value (PQI_R) or a latency requirement value (PQI_L)

Referring to FIG. 9A, UE1 900 may acquire configuration information on whether to transmit feedback signaling for a sidelink flow or a sidelink packet corresponding to a unicast-based direct communication, in operation 901. Operation 901 may refer to an embodiment of FIG. 6A to FIG. 8B.

UE1 900 may transmit AS configuration or SLRB configuration information for the sidelink flow or the sidelink packet to UE2 950 in operation 902, and according to an embodiment of the disclosure, the information may include configuration information on whether to transmit feedback signaling. The information transmitted in operation 902 may include [Table 6] above. In operation 902, feedback configuration information which can be used by a reception terminal when the reception terminal transmits feedback signaling may be transferred together. Signaling performed in operation 902 corresponds to at least one of PC5 RRC unicast signaling or groupcast signaling. UE2 950 may transmit a configuration complete message as a response to an AS configuration or SLRB configuration for the sidelink flow or the sidelink packet, in operation 903.

Figure 9B:
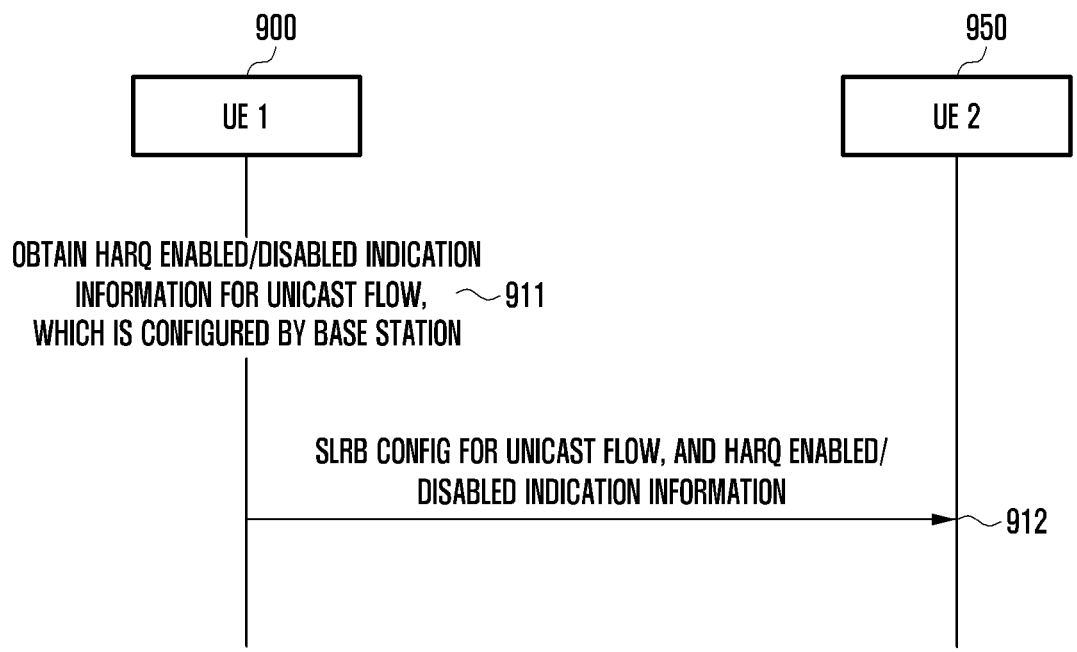
FIG. 9B illustrates a signaling procedure for configuring a parameter for determining whether to transmit feedback signaling between terminals which transmit and receive a V2X packet, based on direct communication according to various embodiments of the disclosure.

Referring to FIG. 9B, UE1 900 may acquire configuration information on whether to transmit feedback signaling for a sidelink flow or a sidelink packet corresponding to a unicast-based direct communication, in operation 911. Operation 911 may refer to an embodiment of FIG. 6A to FIG. 8C. UE1 900 may transmit AS configuration or SLRB configuration information for the sidelink flow or the sidelink packet to UE2 950 in operation 912, and according to an embodiment of the disclosure, the information may include configuration information on whether to transmit feedback signaling. The information transmitted in operation 912 may include [Table 6] above. In operation 912, feedback configuration information which can be used by a reception terminal when the reception terminal transmits feedback signaling may be transferred together. Signaling performed in operation 912 corresponds to at least one of PC5 RRC broadcast signaling, unicast signaling, or groupcast signaling.

According to an embodiment of the disclosure, a case of configuring whether to transmit feedback signaling, in PC5 MAC signaling may be operated similar to a case illustrated in FIG. 9A or FIG. 9B. PC5 MAC signaling may be used instead of PC5 RRC signaling.

Referring to FIG. 9C, UE1 900 may acquire configuration information on whether to transmit feedback signaling for a sidelink flow or a sidelink packet corresponding to a unicast-based direct communication, in operation 921. Operation 921 may refer to an embodiment of FIG. 6A to FIG. 8B. UE1 900 may transmit SCI information for the sidelink flow or the sidelink packet to UE2 950 in operation 922, and according to an embodiment of the disclosure, the information may include configuration information on whether to transmit feedback signaling. The information transmitted in operation 922 may include [Table 7] above.

For example, information indicating whether to transmit feedback signaling in PSCCH SCI may be expressed by an HARQ feedback enabled indicator.

| | |
|---|---|
| CFI (to support cross-carrier sidelink scheduling) | 3 bits |
| Lowest index of the sub-channel allocation Frequency resource location | |
| Time gap between initial transmission and retransmission | 4 bits |
| Padding bits | To match the size of DCI 0 in the same search space |
| HARQ feedback enabled indicator | 1 bit (0: disabled, 1: enabled) |

(It may be configured for a particular application or a particular cast type that feedback signaling is to be transmitted when a packet is not successfully received. However, the disclosure is described under the assumption that, if a packet is successfully received, ACK is transmitted, and if a packet fails to received successfully, NAK is transmitted.)

If the HARQ feedback enabled indicator is configured to be 1, a reception terminal may recognize that transmission of feedback signaling for a packet or flow corresponding to the SCI is indicated, and then transmit a feedback for the packet or flow. If the HARQ feedback enabled indicator is configured to be 0, a reception terminal may recognize that non-transmission of feedback signaling for a packet or flow corresponding to the SCI is indicated, and then may not transmit a feedback for the packet or flow.

As another example, information indicating whether to transmit feedback signaling in PSCCH SCI may be expressed by a PQI_R or PQI_L. The PSCCH SCI includes at least one of a PQI_R or PQI_L.

| | |
|---|---|
| CFI (to support cross-carrier sidelink scheduling) | 3 bits |
| Lowest index of the sub-channel allocation Frequency resource location Time gap between initial transmission and retransmission | 4 bits |
| Padding bits | To match the size of DCI 0 in the same search space |
| PQI_R | Value |
| PQI_L | Value |

When SCI including a PQI_R or a PQI-L is received, the reception terminal may apply a reliability threshold to the PQI_R with respect to a packet or flow corresponding to the SCI, apply a latency threshold to the PQI_L, and determine whether to transmit feedback signaling, based on a condition of [Table 2] above.

Next, referring to FIG. 10A or FIG. 10B, an operation of a transmission terminal and a reception terminal according to an embodiment of the disclosure will be described.

Figure 10A:
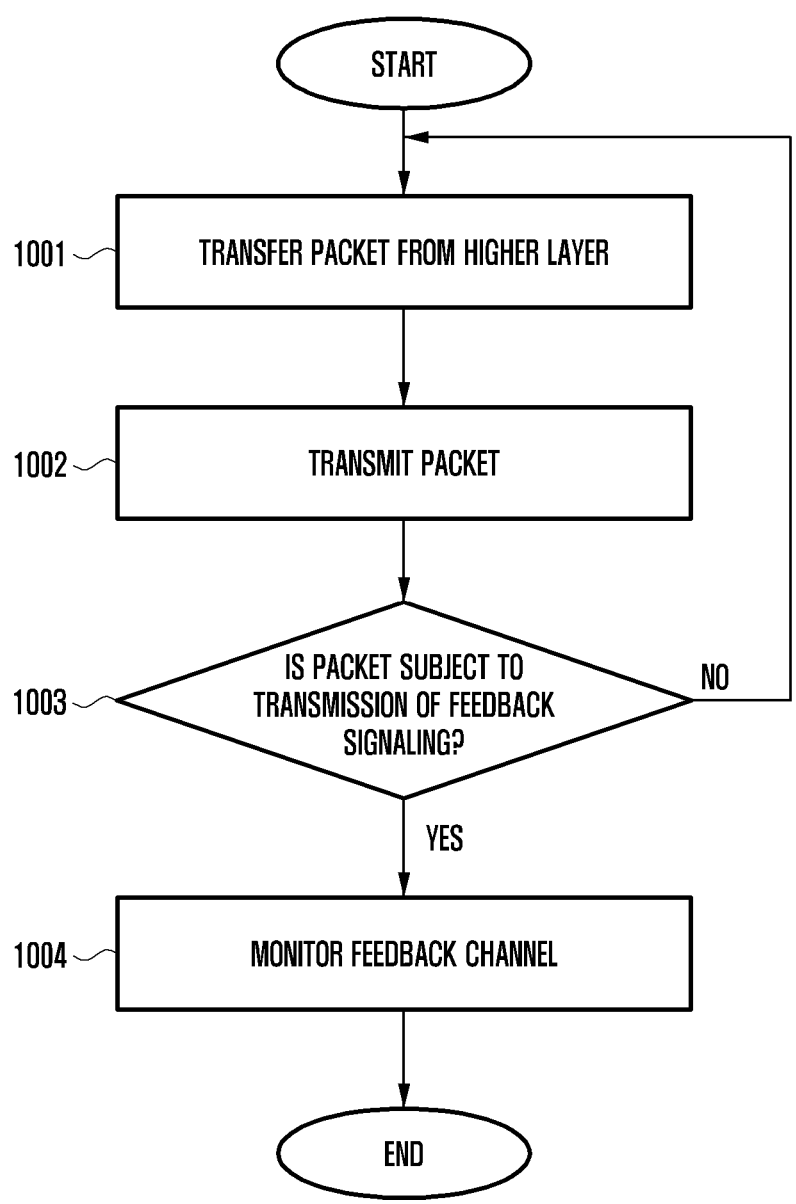
FIG. 10A illustrates an operation of a transmission terminal according to various embodiments of the disclosure.

Referring to FIG. 10A, when a packet is transferred from a higher layer of a transmission terminal in operation 1001, the transmission terminal may transmit the packet to a reception terminal in operation 1002. The transmission terminal may determine whether to transmit feedback signaling for the packet in operation 1003 according to methods of FIG. 6A to FIG. 9C. If the packet is a packet for which feedback signaling is transmittable according to the determination of operation 1003, the transmission terminal may monitor a feedback channel in operation 1004. If the packet is a packet for which feedback signaling is not to be transmitted according to the determination of operation 1003, the transmission terminal may proceed to operation 1001.

Figure 10B:
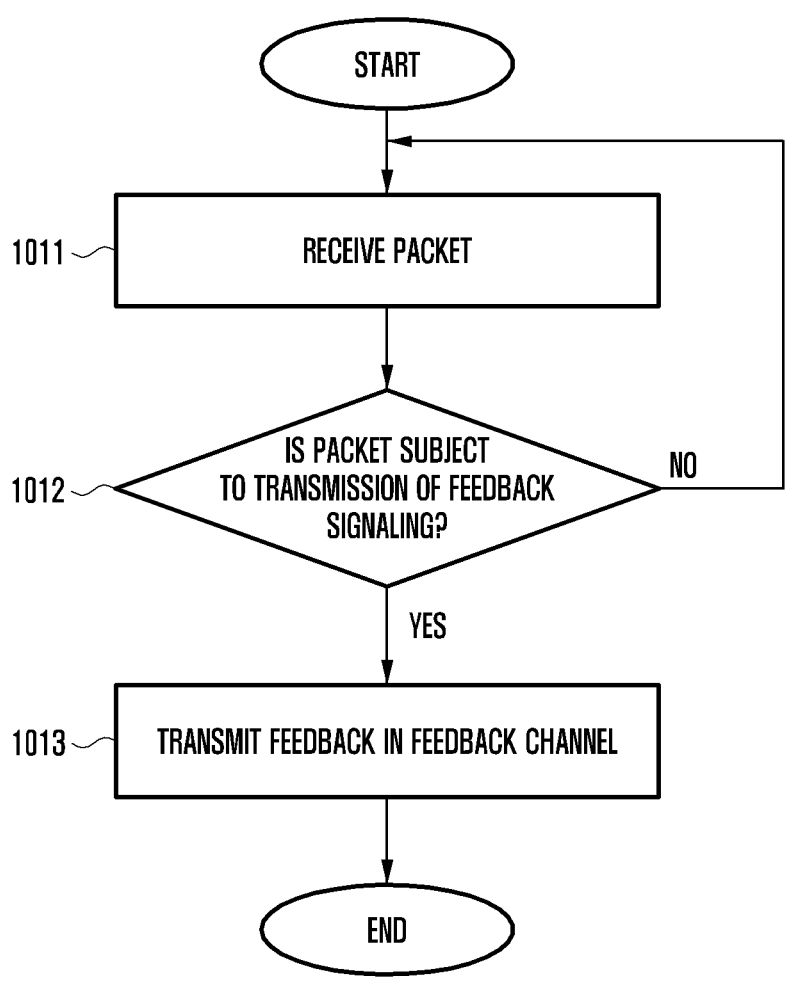
FIG. 10B illustrates an operation of a reception terminal according to various embodiments of the disclosure.

Referring to FIG. 10B, a reception terminal may receive a packet from a transmission terminal in operation 1011. The reception terminal may determine whether the packet is subject to transmission of feedback signaling, in operation 1012 according to methods of FIG. 6A to FIG. 9C. If the packet is subject to transmission of feedback signaling according to the determination of operation 1012, the reception terminal may transmit a feedback in a feedback channel in operation 1013. If the packet is not subject to transmission of feedback signaling according to the determination of operation 1012, the reception terminal may proceed to operation 1011.

Next, referring to FIG. 11A to FIG. 11C, a signal exchange between a terminal and a base station for processing of a feedback signaling transmission resource according to an embodiment of the disclosure will be described.

Figure 11A:
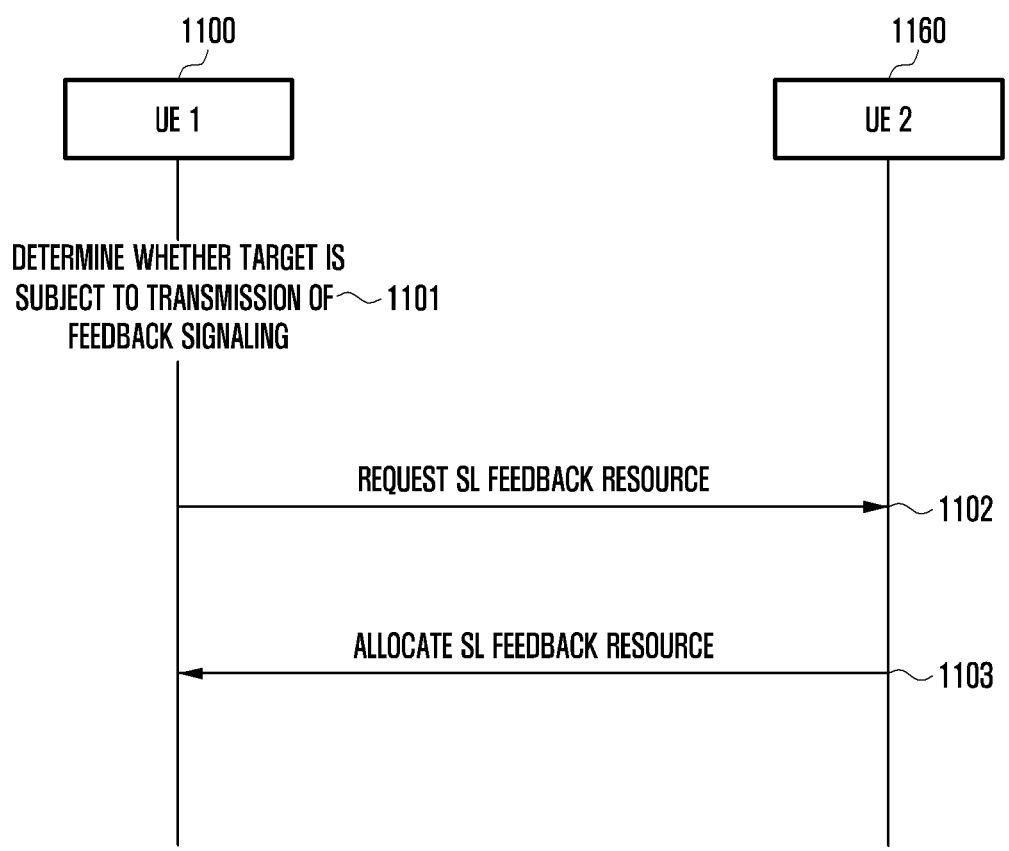
FIG. 11A illustrates a signaling procedure between a terminal and a base station, for processing a feedback signaling transmission resource according to various embodiments of the disclosure.

Referring to FIG. 11A, a terminal may determine whether a sidelink packet or flow is subject to transmission of feedback signaling, in operation 1101. If transmission of feedback signaling is required, the terminal may request a sidelink feedback resource required for the transmission of feedback signaling from a base station in operation 1102. The base station may allocate the sidelink feedback resource to the terminal in operation 1103.

Figure 11B:
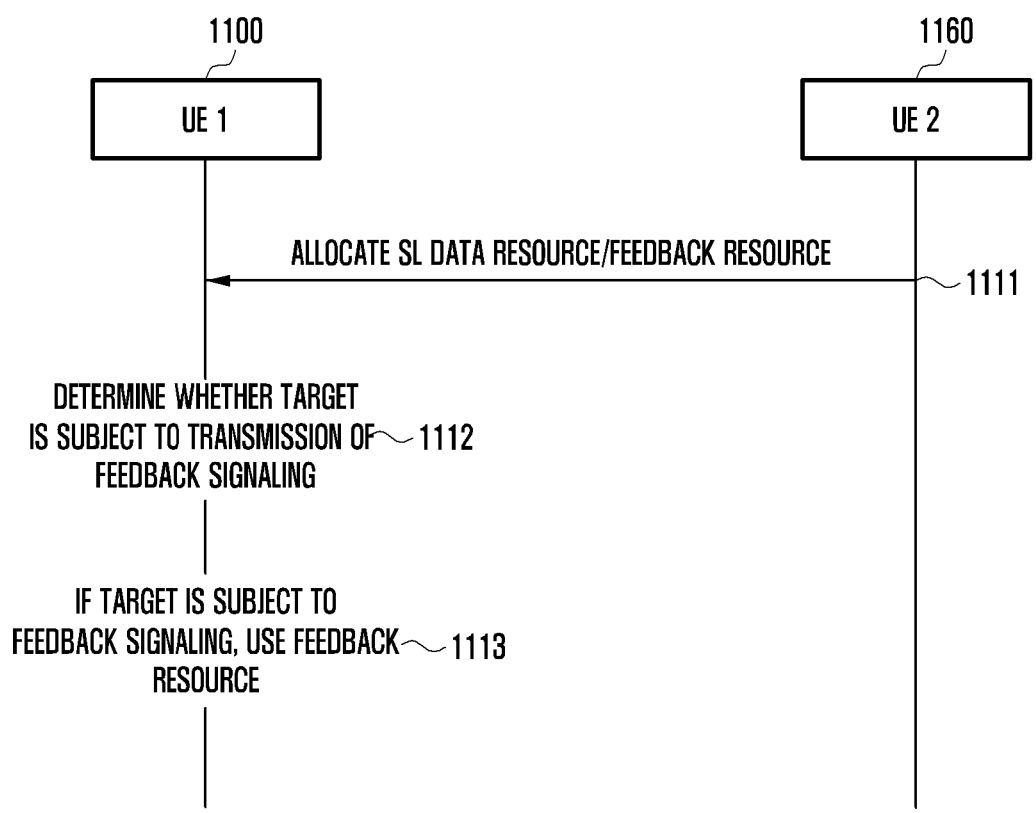
FIG. 11B illustrates a signaling procedure between a terminal and a base station, for processing a feedback signaling transmission resource according to various embodiments of the disclosure.

Referring to FIG. 11B, a base station may allocate a sidelink data resource and a sidelink feedback resource to a terminal in operation 1111. The base station may allocate a resource (a packet and a feedback) to be used in sidelink unicast or sidelink groupcast. The terminal may determine whether a sidelink flow or a sidelink packet is subject to transmission of feedback signaling, in operation 1112. If it is determined that transmission of feedback signaling is required, the terminal may transmit the feedback signaling by using the sidelink feedback resource allocated by the base station in operation 1111, in operation 1113.

Figure 11C:
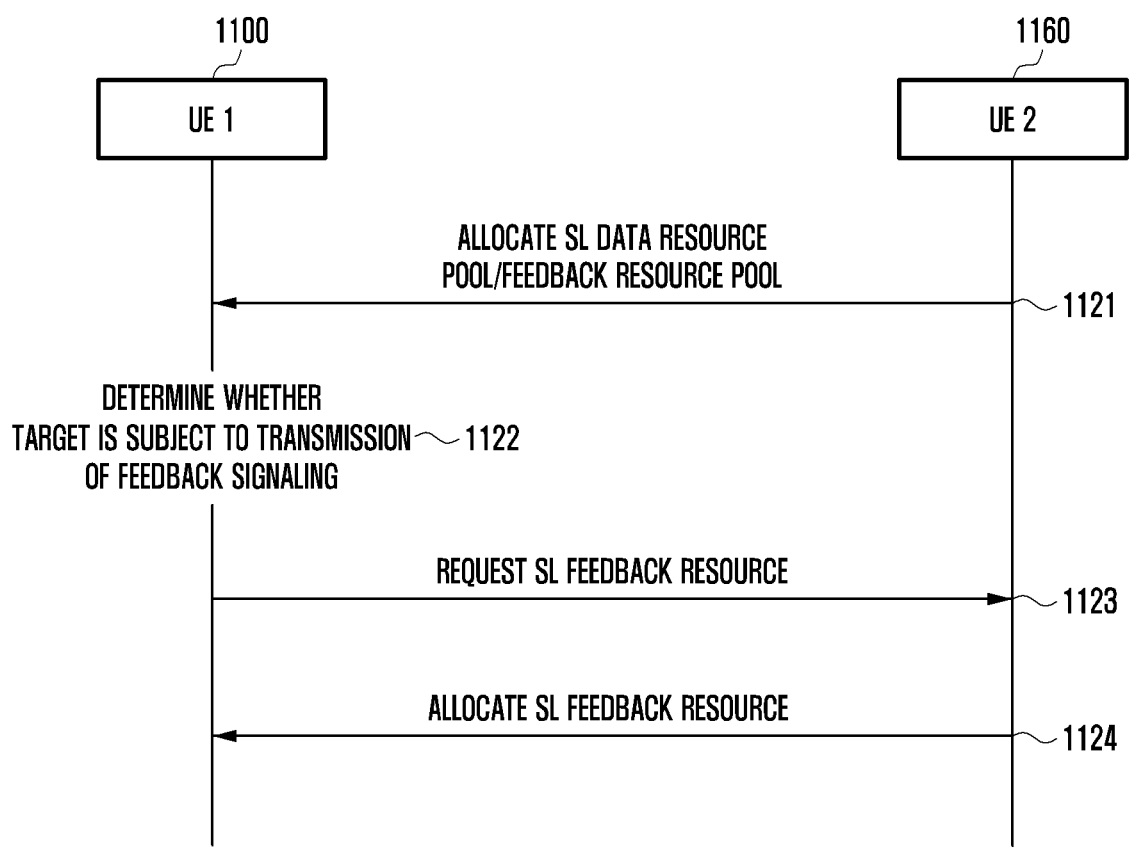
FIG. 11C illustrates a signaling procedure between a terminal and a base station, for processing a feedback signaling transmission resource according to various embodiments of the disclosure.

Referring to FIG. 11C, a base station may allocate a sidelink data resource pool and a sidelink feedback resource pool to a terminal in operation 1121. The resource pool may correspond to a resource pool (a packet and a feedback) to be used in sidelink unicast or sidelink groupcast. The terminal may determine whether a sidelink flow or a sidelink packet is subject to transmission of feedback signaling, in operation 1122. If it is determined that transmission of feedback signaling is required, the terminal may request the base station to allocate a resource required for transmission of a sidelink feedback in the resource pool allocated in operation 1121, in operation 1123. The base station may allocate a resource required by the terminal to transmit a sidelink feedback, in operation 1124.

Methods of FIG. 6A to FIG. 11C may be used as embodiments for processing whether to transmit feedback signaling for a V2X packet transmitted or received through a unicast or groupcast-based device-to-device communication. In a case of groupcast, if there is no a PC5 RRC unicast connection between terminals, after a PC5 RRC unicast connection is configured, configuration information for determining whether to transmit feedback signaling according to an embodiment of the disclosure may be processed.

Next, according to various embodiments of the disclosure, a method for configuring a parameter for determining application of an RLC acknowledged mode (AM) or application of an RLC unacknowledged mode (UM) in V2X packet transmission or reception through a device-to-device communication will be described.

When an RLC AM mode is applied, an ARQ may be used to enhance the reliability of packet transmission. An RLC AM mode may be applied to a V2X application in which reliability is more important than latency. An RLC UM mode may be applied to a V2X application in which latency is more important than reliability.

The parameter for determining application of an RLC AM mode or application of an RLC UM mode in direct communication may be acquired through at least one configuration information among RRC dedicated signaling, V2X SIB signaling, and pre-configuration, as in the embodiments of FIG. 6A to FIG. 9C. The configuration information may be transferred through PC5 signaling between terminals (e.g., a PC5 RRC bearer configuration) or Uu RRC signaling between a terminal and a base station (e.g., an RRC reconfiguration for an SL bearer configuration). In addition, a method for previously configuring an LCD for application of an RLC AM mode among SL LCIDs corresponding to an SLRB of a sidelink flow or sidelink packet, and previously configuring an LCD for application of an RLC UM mode may also be applied. For example, SL LCD number 4 to SL LCD number 10 may be configured for application of an RLC AM mode. For example, SL LCID number 11 to SL LCID number 20 may be configured for application of an RLC UM mode.

An HARQ repetition method for retransmitting a packet without feedback may be applied to correspond to a reliability requirement value or a latency requirement value for a sidelink packet or flow, other than a feedback signaling method. A combination of an HARQ repetition method and a feedback signaling method may corresponding to one of the following combinations. Which combination is to be used may be determined by a terminal or a base station according to a radio condition and a service standard for a sidelink packet or flow.

1. If HARQ feedback is disabled, HARQ repetition is disabled
2. If HARQ feedback is disabled, HARQ repetition is enabled
3. If HARQ feedback is enabled, HARQ repetition is disabled
4. If HARQ feedback is enabled, HARQ repetition is enabled In a case where an HARQ repetition method is applied to sidelink unicast, a transmission terminal may determine an HARQ repetition, mark whether to perform repetition in SCI information, and transmit the SCI information, and a reception terminal may refer to the SCI information to determine whether to perform an HARQ repetition.

In a case where an HARQ repetition method and a feedback signaling method are used together as shown in number 4, feedback signaling may be transmitted for every packet (including an initially transmitted packet and a packet transmitted through repetition) as an embodiment. That is, an ACK or an NACK may be transmitted for each packet.

In another embodiment, feedback signaling may be configured to transmit an NACK when reception of all packets (including an initially transmitted packet and a packet transmitted through repetition) has failed. Feedback signaling may be configured to transmit an ACK when reception of at least one packet (including an initially transmitted packet and a packet transmitted through repetition) is received.

Based on various embodiments of FIG. 6A to FIG. 11C, an operation of a terminal and a base station in a case where determination on HARQ feedback enabled or HARQ feedback disabled for an SL flow or an SL packet is performed by the terminal or is performed by the base station has been discussed. An operation of a terminal and a base station according to which entity (the terminal or the base station) is to determine HARQ feedback enabled/disabled, and which entity (the terminal or the base station) is to allocate an SL grant according to the determination on HARQ feedback enabled/disabled will be described based on FIG. 12 to FIG. 14.

According to various embodiments of the disclosure, HARQ feedback may be applied for each SL resource pool. For example, if HARQ feedback enabled is configured for SL resource pool A, a terminal having received a packet transmitted using a resource in pool A may transmit an HARQ feedback for the packet. As another example, if HARQ feedback disabled is configured for SL resource pool B, a terminal having received a packet transmitted using a resource in pool B may not transmit an HARQ feedback for the packet. Therefore, in a case of an SL flow or an SL packet for which it is determined that HARQ feedback is required, a terminal and a base station are required to be operated to select a resource from an SL resource pool for which HARQ feedback enabled is configured. In a case of an SL flow or an SL packet for which it is determined that HARQ feedback is not required, a terminal and a base station are required to be operated to select a resource from an SL resource pool for which HARQ feedback disabled is configured.

Figure 12:
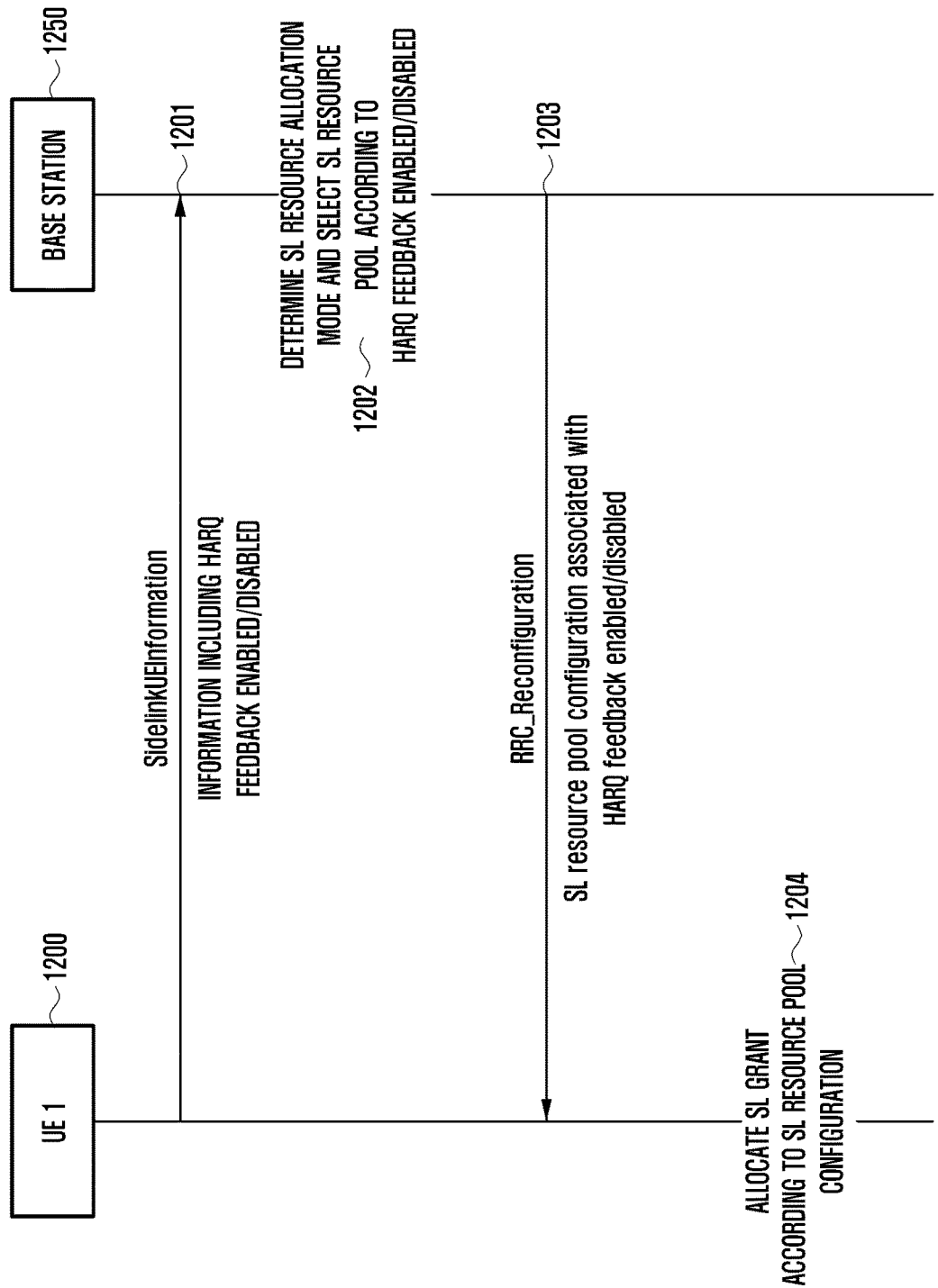
FIG. 12 illustrates a signal flow chart of a terminal transferring HARQ feedback assistance information to a base station according to various embodiments of the disclosure.

FIG. 12 is a diagram illustrating a signal flow of a terminal transferring HARQ feedback assistance information to a base station according to one embodiment of the disclosure.

An embodiment of FIG. 12 may be used in a case where a base station allocates an SL grant to a terminal in an RRC_CONNECTED state, or the terminal allocates an SL grant by itself according to an indication of the base station.

In a case where a base station allocates an SL grant to a terminal (mode 1), the base station is required to select an SL resource pool, based on information of the terminal, relating to whether to transmit HARQ feedback, and allocate an SL grant from the corresponding pool. To this end, the base station is required to acquire information on whether to transmit HARQ feedback from the terminal. In a case where a terminal allocates an SL grant by itself according to an indication of a base station (mode 2), the base station is required to select an SL resource pool, based on information of the terminal, relating to whether to transmit HARQ feedback, and indicate the terminal to allocate an SL grant from the corresponding pool by itself. To this end, the base station is required to acquire information on whether to transmit HARQ feedback from the terminal.

Referring to FIG. 12, a terminal 1200 may transmit a message including information on whether to transmit HARQ feedback to a base station 1250 in operation 1201. The message used in operation 1201 may be replaced with a SidelinkUEInformation message or a UEAssistanceInformation message. The SidelinkUEInformation message or UEAssistanceInformation message which is transmitted by the terminal to the base station may include at least one or a combination of pieces of information in [Table 8] below.

TABLE 8

Destination Index
Source Index
Cast type (broadcast, groupcast, unicast)
HARQ feedback enabled indication
SL flow information
SL logical channel information
SL HARQ process information
Interested SL resource allocation mode (mode 1, mode 2)
SL QoS information In operation 1202, the base station may receive information as shown in [Table 8] from the terminal, and may determine, from SL HARQ feedback enabled indication information, that HARQ feedback is configured to be transmitted or received. The base station may decide to directly allocate an SL grant to the terminal (mode 1). If HARQ feedback is configured to be transmitted or received, the base station may allocate an SL grant to the terminal from an SL resource pool for which HARQ feedback enabled is configured. The SL grant is at least one among a dynamic SL grant, configured grant type 1, configured grant type 2, and an SPS SL grant. In operation 1203, the base station may transmit a message including information on a configuration of the SL grant to the terminal. The configuration of the SL grant, which is transmitted by the base station to the terminal, may include at least one or a combination of pieces of information in [Table 9] below.

TABLE 9

Destination index
Source Index
Cast type (broadcast, groupcast, unicast)
SL resource pool for SL dynamic grant
SL resource configuration for configured grant type 1
SL resource configuration for configured grant type 2
SL flow information
SL logical channel information
SL HARQ process information
SL resource allocation mode (mode 1)

[Table 9] above may be transmitted in a case where the base station directly allocates an SL grant.

In another embodiment, in operation 1202, the base station may determine that there is no need to transmit or receive HARQ feedback, from SL HARQ feedback enabled indication information in [Table 8], which is received from the terminal. The base station may decide to directly allocate an SL grant to the terminal (mode 1). The base station may allocate an SL grant to the terminal from an SL resource pool for which HARQ feedback disabled is configured. The SL grant is at least one among a dynamic SL grant, configured grant type 1, configured grant type 2, and an SPS SL grant. In operation 1203, the base station may transmit a message including information on a configuration of the SL grant to the terminal. The configuration of the SL grant may include at least one or a combination of pieces of information in [Table 9] above.

As another embodiment, in operation 1202, the base station may decide to indicate the terminal to allocate an SL grant by itself (mode 2). If HARQ feedback is configured to be transmitted or received, based on an HARQ feedback enabled indication in [Table 8] above, the base station may provide, to the terminal, information on an SL resource pool for which HARQ feedback enabled is configured. In operation 1203, the base station may transmit, to the terminal, a message including SL grant configuration information of mode 2, which indicates the terminal to allocate an SL grant by itself. The configuration of the SL grant may include at least one or a combination of pieces of information in [Table 10] below.

TABLE 10

Destination index
Source Index
Cast type (broadcast, groupcast, unicast)
SL resource pool for SL allocation mode 2
SL flow information
SL logical channel information
SL HARQ process information
SL resource allocation mode (mode 2)

In another embodiment, in operation 1202, the base station may determine that there is no need to transmit or receive HARQ feedback, from SL HARQ feedback enabled indication information in [Table 8], which is received from the terminal. The base station may indicate mode 2 so that the terminal allocates an SL grant by itself. The base station may provide, to the terminal, information on an SL resource pool for which HARQ feedback disabled is configured. In operation 1203, the base station may transmit, to the terminal, a message including SL grant configuration information of mode 2, which indicates the terminal to allocate an SL grant by itself. The configuration of the SL grant may include at least one or a combination of pieces of information in [Table 10] above.

In operation 1204, based on information (Table 9 or Table 10) on a configuration of an SL grant, which is received from the base station, the terminal may be allocated an SL grant by the base station, or may allocate an SL grant by itself from an SL resource pool according to an indication of the base station. If an SL grant is allocated by the base station in operation 1204 (mode 1), the SL grant may be selected by the base station from an SL resource pool corresponding to HARQ feedback enabled. As another embodiment, if an SL grant is allocated by the base station in operation 1204 (mode 1), the SL grant may be selected by the base station from an SL resource pool corresponding to HARQ feedback disabled. As another embodiment, if the terminal allocates an SL grant by itself according to an indication of the base station in operation 1204 (mode 2), the terminal may select the SL grant from an SL resource pool corresponding to HARQ feedback enabled, which is indicated by the base station. As another embodiment, if the terminal allocates an SL grant by itself according to an indication of the base station in operation 1204 (mode 2), the terminal may select the SL grant from an SL resource pool corresponding to HARQ feedback disabled, which is indicated by the base station.

The terminal may transmit a packet in an SL grant allocated by the base station and/or an SL grant allocated by the terminal itself, and may perform an operation of monitoring reception of an HARQ feedback from a reception terminal according to an HARQ feedback enabled indication of operation 1201 (in a case of HARQ feedback enabled) or may perform an operation of not monitoring reception of an HARQ feedback (in a case of HARQ feedback disabled).

Figure 13:
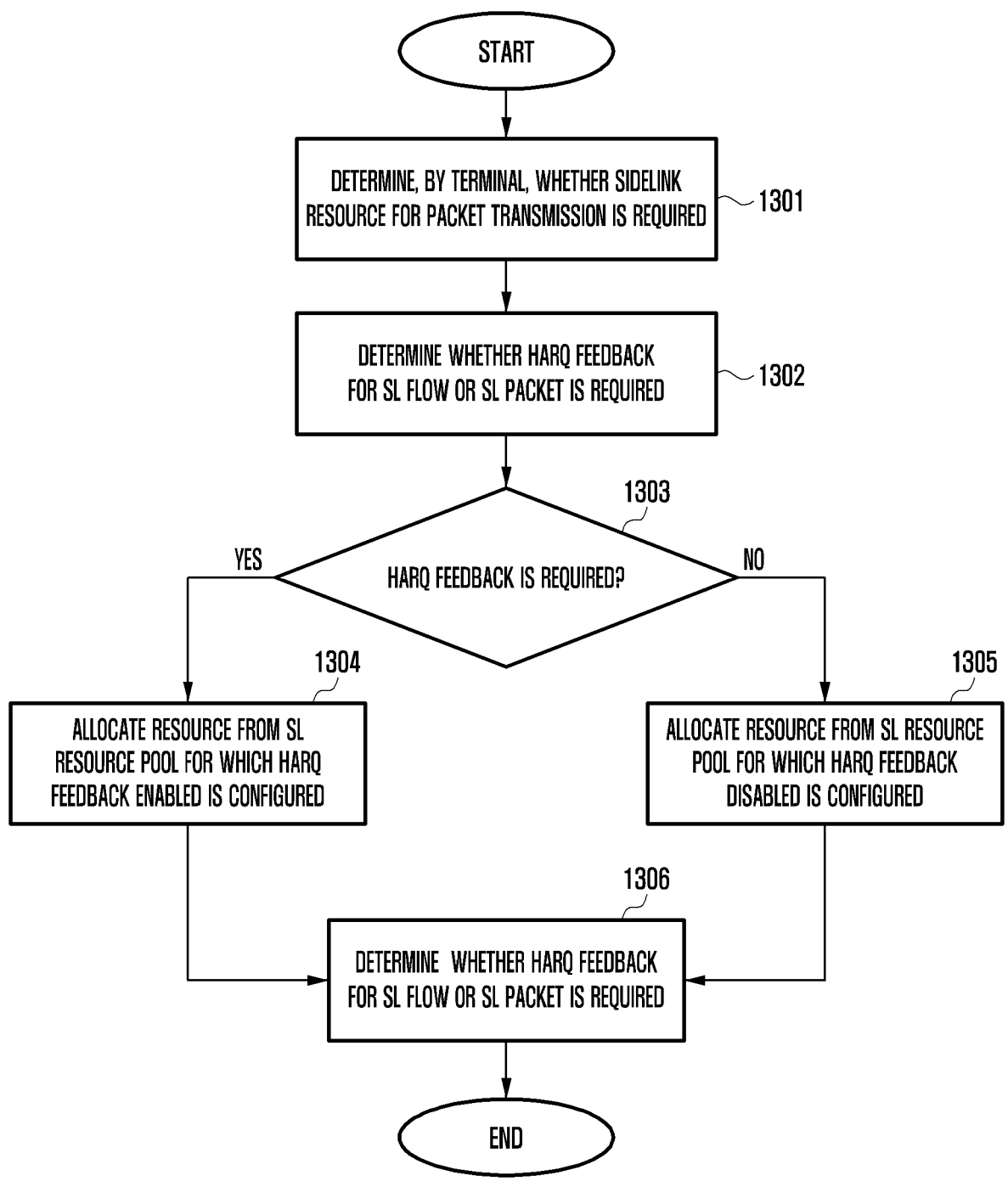
FIG. 13 illustrates an operation in which a terminal selects a sidelink resource by the terminal itself according to whether to transmit a HARQ feedback according to various embodiments of the disclosure.

FIG. 13 is a diagram illustrating an operation in which a terminal selects a sidelink resource by the terminal itself according to whether to transmit a HARQ feedback according to one embodiment of the disclosure.

An embodiment of FIG. 13 may be used in a case where a terminal in an RRC_IDLE, RRC_INACTIVE, or OUT_OF_COVERAGE state allocates an SL grant by itself Referring to FIG. 13, in operation 1301, a terminal in an RRC_IDLE, RRC_INACTIVE, or OUT_OF_COVERAGE state may determine whether there is a need to allocate a sidelink resource, in order to transmit a packet. If a resource allocation is required, in operation 1302, the terminal may determine whether a HARQ feedback for a SL flow or SL packet corresponding to the packet is required. Whether the HARQ feedback is required may be determined according to at least one or a combination of [Table 1] to [Table 7] above.

If it is determined in operation 1303 that an HARQ feedback for the packet is required, the terminal may allocate an SL grant from a sidelink resource pool for which HARQ feedback enabled is configured, in operation 1304. In operation 1306, the terminal may transmit a packet by using the SL grant. Alternatively, if it is determined in operation 1303 that an HARQ feedback for the packet is not required, the terminal may allocate an SL grant from a sidelink resource pool for which HARQ feedback disabled is configured, in operation 1305, and may proceed to operation 1306 to transmit a packet by using the SL grant. The SL grant allocated by the terminal in FIG. 13 may correspond to at least one among a dynamic SL grant, configured grant type 1, configured grant type 2, or an SPS SL grant.

Figure 14:
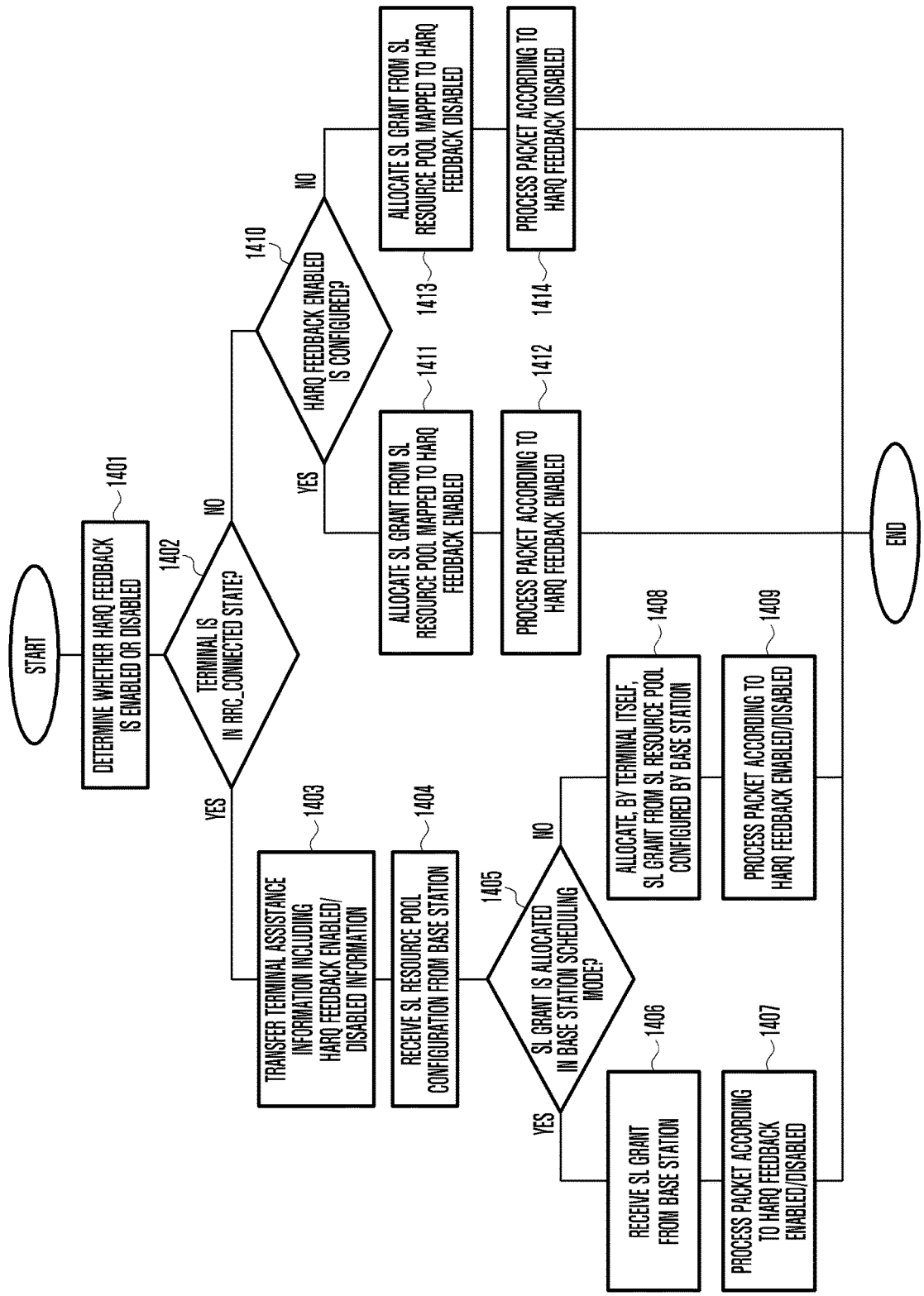
FIG. 14 illustrates an operation of a terminal according to various embodiments of the disclosure.

FIG. 14 is a diagram illustrating an operation of a terminal according to an embodiment of the disclosure.

Referring to FIG. 14, in operation 1401, a terminal may determine whether to transmit HARQ feedback for an SL flow or an SL packet. In operation 1402, the terminal may determine whether the terminal is in an RRC_CONNECTED state. When the terminal is in an RRC_CONNECTED state, the terminal may request to a base station to allocate an SL grant.

When the terminal is determined to be in an RRC_CONNECTED state according to a determination of operation 1402, the terminal may transmit terminal assistance information for an SL grant to the base station in operation 1403. The terminal assistance information may be included in a SidelinkUEInformation message or a UEAssistanceInformation message. The terminal assistance information transmitted in operation 1403 may include information on whether to transmit HARQ feedback, which is based on a determination of operation 1401. That is, SL grant allocation request information for an SL flow or an SL packet for which transmission of HARQ feedback is required, or SL grant allocation request information for an SL flow or an SL packet for which transmission of HARQ feedback is not required may be transmitted from the terminal to the base station.

In operation 1404, the terminal may receive an SL resource pool configuration from the base station. The SL resource pool configuration information may be transmitted through an RRC_ConnectionReconfiguration message or an RRC Reconfiguration message which is transmitted by the base station to the terminal. In operation 1405, the terminal may determine, from the SL resource pool configuration, whether the base station indicates a mode (mode 1) in which the base station allocates an SL grant. If it is determined that the base station is indicated to operate in a mode (mode 1) of allocating an SL grant, the terminal may receive an SL grant from the base station in operation 1406. The base station may allocate an SL grant from a sidelink resource pool corresponding to HARQ feedback enabled, based on information on whether to transmit HARQ feedback, which is transmitted by the terminal in operation 1403, or may allocate an SL grant from a sidelink resource pool corresponding to HARQ feedback disabled.

In operation 1407, the terminal may transmit a packet for an SL flow or an SL packet by using the SL grant. In operation 1407, the terminal may process the packet according to information relating to HARQ feedback enabled or HARQ feedback disabled of the packet, which is determined in operation 1401. For example, if HARQ feedback enabled is configured, the terminal may wait for an HARQ feedback for a packet transmitted in the SL grant. For example, if HARQ feedback disabled is configured, the terminal may not wait for (monitor) an HARQ feedback for a packet transmitted in the SL grant.

In operation 1405, the terminal may determine, from the SL resource pool configuration, whether the base station indicates a mode (mode 2) in which the terminal allocates an SL grant by itself. If it is determined that the base station has indicated a mode (mode 2) in which the terminal allocates an SL grant by itself, the terminal may allocate an SL grant by itself from a sidelink resource pool indicated for allocation of an SL grant in the SL resource pool configuration of operation 1404, in operation 1408. The sidelink resource pool indicated by the base station may correspond to a sidelink resource pool corresponding to HARQ feedback enabled, based on information on whether to transmit HARQ feedback, which is transmitted by the terminal in operation 1403, or may correspond to a sidelink resource pool corresponding to HARQ feedback disabled. The terminal may allocate an SL grant from a sidelink resource pool corresponding to HARQ feedback enabled or a sidelink resource pool corresponding to HARQ feedback disabled according to information relating to HARQ feedback enabled or HARQ feedback disabled of the packet, which is determined in operation 1401.

In operation 1409, the terminal may transmit a packet corresponding to an SL flow or an SL packet by using the SL grant allocated in operation 1408. For example, if HARQ feedback enabled is configured, the terminal may wait for an HARQ feedback for a packet transmitted in the SL grant. For example, if HARQ feedback disabled is configured, the terminal may not wait for an HARQ feedback for a packet transmitted in the SL grant.

If the terminal is not in an RRC_CONNECTED state according to a determination of operation 1402, the terminal may be in at least one state of an RRC_IDLE, RRC_INACTIVE, or OUT_OF_COVERAGE state. If the terminal is in at least one state of an RRC_IDLE, RRC_INACTIVE, or OUT_OF_COVERAGE state, the terminal may allocate an SL grant from an SL resource pool by itself.

In operation 1410, the terminal may determine whether HARQ feedback is enabled, based on determination information relating to whether there is a need to transmit an HARQ feedback for an SL flow or an SL packet, which is determined in operation 1401. If it is determined in operation 1410 that HARQ feedback enabled is configured for the SL flow or SL packet, the terminal may allocate an SL grant from a sidelink resource pool corresponding to HARQ feedback enabled, in operation 1411. In operation 1412, the terminal may transmit a packet corresponding to an SL flow or an SL packet by using the SL grant allocated in operation 1411. In addition, in operation 1412, the terminal may wait for an HARQ feedback for a packet transmitted in the SL grant. Alternatively, if it is determined in operation 1410 that HARQ feedback disabled is configured for the SL flow or SL packet, the terminal may allocate an SL grant from a sidelink resource pool corresponding to HARQ feedback disabled, in operation 1413.

In operation 1414, the terminal may transmit a packet corresponding to an SL flow or an SL packet by using the SL grant allocated in operation 1413. In addition, the terminal may not wait for an HARQ feedback for a packet transmitted in the SL grant.

An operation of a terminal performing a logical channel preferential processing procedure for a logical channel corresponding to an HARQ feedback enabled SL flow or SL packet, or a logical channel corresponding to an HARQ feedback disabled SL flow or SL packet according to an embodiment of the disclosure is as follows.

The terminal may select a destination identifier having a logical channel satisfying the following conditions. The destination identifier may correspond to at least one of unicast, groupcast, and broadcast. The terminal may select one destination identifier having a logical channel having the highest transmission priority among logical channels satisfying the following conditions. If there is one or more destination identifiers having a logical channel satisfying the conditions and having the highest transmission priority, the terminal may select a random destination.

(1) A logical channel has data to transmit
(2) There is a logical channel, the SBj value of which is larger than 0.

The initial value of the SBj value is configured to be 0 for each logical channel. The SBj value is increased by (sPBR× T) every time point at which a logical channel preferential processing procedure is performed. sPBR corresponds to a sidelink prioritized bit rate. T is a time consumed to the current from a time point at which a previous SBj value is calculated. If the SBj value becomes larger than a sidelink bucket size (sPBR×sBSD), the SBj value is configured to be the sidelink bucket size. sBSD corresponds to a sidelink bucket size duration. The SBj value may be operated to prevent a starvation phenomenon in which a logical channel is not given a transmission chance, and thus it is unable to transmit an SL flow or SL packet of the logical channel.

(3) If configured grant type 1 is allowed for an SL grant, configured grant type 1 is configured for a corresponding logical channel.
(4) If HARQ feedback is allowed for an SL grant, HARQ feedback enabled is configured for a corresponding logical channel.

The terminal may select a logical channel satisfying the following conditions with respect to the selected destination identifier.

(1) A logical channel has data to transmit
(2) If configured grant type 1 is allowed for an SL grant, configured grant type 1 is configured for a corresponding logical channel.
(3) If HARQ feedback is allowed for an SL grant, HARQ feedback enabled is configured for a corresponding logical channel.

The terminal may transmit an SL flow or SL packet corresponding to the selected logical channel through an SL grant. In an embodiment, if HARQ feedback enabled is configured for the selected logical channel, transmission may be performed through an HARQ feedback enabled SL grant. If HARQ feedback enabled is configured, and multiple logical channels are selected, an SL flow or SL packet corresponding to the multiple logical channels may be transmitted through an HARQ feedback enabled SL grant. In an embodiment, if HARQ feedback disabled is configured for the selected logical channel, transmission may be performed through an HARQ feedback disabled SL grant. If HARQ feedback disabled is configured, and multiple logical channels are selected, an SL flow or SL packet corresponding to the multiple logical channels may be transmitted through an HARQ feedback disabled SL grant.

According to an embodiment of the disclosure, if it is determined that HARQ feedback disabled or HARQ feedback enabled is configured for a logical channel corresponding to an SL flow or an SL packet, but an HARQ feedback disabled resource pool is configured, and an HARQ feedback enabled resource pool is not configured, the terminal may neglect a HARQ feedback disabled or HARQ feedback enabled configuration, which is configured for a logical channel corresponding to the SL flow or the SL packet, and may operate according to an HARQ feedback disabled configuration, which is configured in the resource pool. That is, it is determined that HARQ feedback disabled is configured with respect to the resource pool, and thus the terminal may perform an operation of a case where HARQ feedback disabled is configured for a logical channel of an SL flow or an SL packet.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method performed by a first terminal in a wireless communication system, the method comprising:
receiving, from a base station, configuration information including first information on a sidelink hybrid automatic repeat request (HARQ) feedback set to enabled or disabled for a logical channel;
selecting at least one logical channel among a plurality of logical channels, wherein the at least one logical channel includes sidelink data to transmit and the at least one logical channel is configured with the sidelink HARQ feedback set to enabled based on the first information;
obtaining a medium access control (MAC) protocol data unit (PDU) including the sidelink data of the selected at least one logical channel;
setting a HARQ feedback indicator to enabled based on the first information;
transmitting, to a second terminal, the MAC PDU and the HARQ feedback indicator set to enabled; and
monitoring feedback information related to the MAC PDU.

2. The method of claim 1, wherein the configuration information is received via a radio resource control (RRC) message in case that the first terminal is in an RRC connected state.

3. The method of claim 2, wherein the RRC message further includes information on a resource pool for the sidelink, and
wherein sidelink data of another logical channel configured with the sidelink HARQ feedback set to disabled is not multiplexed in the MAC PDU.

4. The method of claim 3, wherein the feedback information is monitored based on the information on the resource pool.

5. The method of claim 2, further comprising:
transmitting, to the base station, a sidelink user equipment (UE) information message to request assignment of a sidelink radio bearer configuration,
wherein the RRC message is received based on the sidelink UE information message.

6. The method of claim 5, wherein the sidelink UE information message includes information on a destination identity, information on a cast type, and information on quality of service (QOS) of a sidelink flow.

7. The method of claim 1, wherein the configuration information is received via system information in case that the first terminal is in an RRC inactive state or an RRC idle state.

8. A first terminal in a wireless communication system, the first terminal comprising:
a transceiver; and
a controller configured to:
control the transceiver to receive, from a base station, configuration information including first information on a sidelink hybrid automatic repeat request (HARQ) feedback set to enabled or disabled for a logical channel,
select at least one logical channel among a plurality of logical channels, wherein the at least one logical channel includes sidelink data to transmit and the at least one logical channel is configured with the sidelink HARQ feedback set to enabled based on the first information,
obtain a medium access control (MAC) protocol data unit (PDU) including the sidelink data of the selected at least one logical channel,
set a HARQ feedback indicator to enabled based on the first information,
control the transceiver to transmit, to a second terminal, the MAC PDU and the HARQ feedback indicator set to enabled, and
monitor feedback information related to the MAC PDU.

9. The first terminal of claim 8, wherein the configuration information is received via a radio resource control (RRC) message in case that the first terminal is in an RRC connected state.

10. The first terminal of claim 9, wherein the controller is further configured to control the transceiver to transmit, to the base station, a sidelink user equipment (UE) information message to request assignment of a sidelink radio bearer configuration, and
wherein the RRC message is received based on the sidelink UE information message.

11. The first terminal of claim 10, wherein the sidelink UE information message includes information on a destination identity, information on a cast type, and information on quality of service (QOS) of a sidelink flow.

12. The first terminal of claim 9, wherein the RRC message further includes information on a resource pool for the sidelink, and
wherein sidelink data of another logical channel configured with the sidelink HARQ feedback set to disabled is not multiplexed in the MAC PDU.

13. The first terminal of claim 12, wherein the feedback information is monitored based on the information on the resource pool.

14. The first terminal of claim 8, wherein the configuration information is received via system information in case that the first terminal is in an RRC inactive state or an RRC idle state.

* * * * *